United States Patent
Zhou et al.

(10) Patent No.: US 11,538,140 B2
(45) Date of Patent: Dec. 27, 2022

(54) IMAGE INPAINTING BASED ON MULTIPLE IMAGE TRANSFORMATIONS

(71) Applicant: ADOBE INC., San Jose, CA (US)

(72) Inventors: Yuqian Zhou, Urbana, IL (US); Elya Shechtman, Seattle, WA (US); Connelly Stuart Barnes, Seattle, WA (US); Sohrab Amirghodsi, Seattle, WA (US)

(73) Assignee: ADOBE INC., San Jose, CA (US)

( * ) Notice: Subject to any disclaimer, the term of this patent is extended or adjusted under 35 U.S.C. 154(b) by 30 days.

(21) Appl. No.: 17/098,055

(22) Filed: Nov. 13, 2020

(65) Prior Publication Data

US 2022/0156893 A1    May 19, 2022

(51) Int. Cl.
*G06T 5/00* (2006.01)
*G06T 5/50* (2006.01)
*G06T 3/00* (2006.01)
*G06N 3/08* (2006.01)

(52) U.S. Cl.
CPC .............. *G06T 5/005* (2013.01); *G06N 3/08* (2013.01); *G06T 3/0093* (2013.01); *G06T 5/50* (2013.01); *G06T 2207/10024* (2013.01); *G06T 2207/20081* (2013.01); *G06T 2207/20084* (2013.01); *G06T 2207/20221* (2013.01); *G06T 2207/20224* (2013.01)

(58) Field of Classification Search
CPC ......... G06T 5/005; G06T 3/0093; G06T 5/50; G06T 2207/10024; G06T 2207/20081; G06T 2207/20084; G06T 2207/20221; G06T 2207/20224; G06N 3/08
See application file for complete search history.

(56) References Cited

U.S. PATENT DOCUMENTS

| 10,290,085 | B2 * | 5/2019 | Lin | G06K 9/6267 |
|---|---|---|---|---|
| 10,614,557 | B2 * | 4/2020 | Lin | G06N 3/08 |
| 11,398,255 | B1 * | 7/2022 | Mann | G06V 40/161 |
| 2014/0064614 | A1 * | 3/2014 | Hung | G06T 3/4092 |
| | | | | 382/167 |
| 2018/0330470 | A1 * | 11/2018 | Karki | G06V 10/273 |
| 2019/0057527 | A1 * | 2/2019 | Jin | G06N 3/02 |
| 2019/0295227 | A1 * | 9/2019 | Wang | G06T 5/005 |
| 2019/0355102 | A1 * | 11/2019 | Lin | G06K 9/6232 |
| 2019/0371080 | A1 * | 12/2019 | Sminchisescu | G06T 13/40 |
| 2020/0327675 | A1 * | 10/2020 | Lin | G06T 7/194 |
| 2021/0118119 | A1 * | 4/2021 | Yuan | G06T 7/0002 |
| 2021/0118149 | A1 * | 4/2021 | Sollami | G06V 40/103 |

(Continued)

OTHER PUBLICATIONS

Han et al., "VITON: An Image-based Virtual Try-on Network," arXiv:1711.08447v4[cs.CV] Jun. 12, 2018.*

(Continued)

*Primary Examiner* — Xuemei G Chen
(74) *Attorney, Agent, or Firm* — Shook, Hardy & Bacon L.L.P.

(57) ABSTRACT

Various disclosed embodiments are directed to inpainting one or more portions of a target image based on merging (or selecting) one or more portions of a warped image with (or from) one or more portions of an inpainting candidate (e.g., via a learning model). This, among other functionality described herein, resolves the inaccuracies of existing image inpainting technologies.

20 Claims, 11 Drawing Sheets

(56) References Cited

U.S. PATENT DOCUMENTS

2021/0334935 A1* 10/2021 Grigoriev ............... G06N 3/08
2021/0357625 A1* 11/2021 Song .................... G06V 40/168

OTHER PUBLICATIONS

Zeng, Y., Lin, Z., Yang, J., Zhang, J., Shechtman, E., & Lu, H. (2020, August). High-resolution image inpainting with iterative confidence feedback and guided upsampling. In European Conference on Computer Vision (pp. 1-17). Springer, Cham.

Xiong, W., Yu, J., Lin, Z., Yang, J., Lu, X., Barnes, C., & Luo, J. (2019). Foreground-aware image inpainting. In Proceedings of the IEEE/CVF Conference on Computer Vision and Pattern Recognition (pp. 5840-5848).

Yu, J., Lin, Z., Yang, J., Shen, X., Lu, X., & Huang, T. S. (2019). Free-form image inpainting with gated convolution. In Proceedings of the IEEE/CVF International Conference on Computer Vision (pp. 4471-4480).

Liao, L., Xiao, J., Wang, Z., Lin, C. W., & Satoh, S. I. (2020). Guidance and evaluation: Semantic-aware image inpainting for mixed scenes arXiv preprint arXiv:2003.06877.

Nazeri, K., Ng, E., Joseph, T., Qureshi, F. Z., & Ebrahimi, M. (2019). Edgeconnect: Generative image inpainting with adversarial edge learning. arXiv preprint arXiv:1901.00212.

Song, Y., Yang, C., Shen, Y., Wang, P., Huang, Q., & Kuo, C. C. J. (2018). Spg-net: Segmentation prediction and guidance network for image inpainting. arXiv preprint arXiv: 1805.03356.

Ren, Y., Yu, X., Zhang, R., Li, T. H., Liu, S., & Li, G. (2019). Structureflow: Image inpainting via structure-aware appearance flow. In Proceedings of the IEEE/CVF International Conference on Computer Vision (pp. 181-190).

Zheng, C., Cham, T. J., & Cai, J. (2019). Pluralistic image completion. In Proceedings of the IEEE/CVF Conference on Computer Vision and Pattern Recognition (pp. 1438-1447).

Oh, S. W., Lee, S., Lee, J. Y., & Kim, S. J. (2019). Onion-peel networks for deep video completion. In Proceedings of the IEEE/CVF International Conference on Computer Vision (pp. 4403-4412).

Lowe, D. G. (1999, September). Object recognition from local scale-invariant features. In Proceedings of the seventh IEEE international conference on computer vision (vol. 2, pp. 1150-1157). Ieee.

Zhang, J., Sun, D., Luo, Z., Yao, A., Zhou, L., Shen, T., ... & Liao, H. (2019). Learning two-view correspondences and geometry using order-aware network. In Proceedings of the IEEE/CVF International Conference on Computer Vision (pp. 5845-5854).

Zhou, Y., Ren, D., Emerton, N., Lim, S., & Large, T. (2020). Image restoration for under-display camera. arXiv preprint arXiv:2003.04857.

Jaderberg, M., Simonyan, K., Zisserman, A., & Kavukcuoglu, K. (2015). Spatial transformer networks. arXiv preprint arXiv:1506.02025.

Zhou, T., Tucker, R., Flynn, J., Fyffe, G., & Snavely, N. (2018). Stereo magnification: Learning view synthesis using multiplane images. arXiv preprint arXiv:1805.09817.

Zhang, R., Isola, P., Efros, A. A., Shechtman, E., & Wang, O. (2018). The unreasonable effectiveness of deep features as a perceptual metric. In Proceedings of the IEEE conference on computer vision and pattern recognition (pp. 586-595).

* cited by examiner

IMAGE INPAINTING BASED ON MULTIPLE IMAGE TRANSFORMATIONS

BACKGROUND

Various technologies render media (e.g., photographic images) or provide varied functionality associated with media. For example, media editing software (e.g., Adobe® Photoshop®, Adobe After Effects®, and Adobe Premiere®) provide tools (e.g., cut, paste, select) to users so that they can modify visual data of digital images and video. However, these software applications and other technologies generally lack the functionality to adequately inpaint one or more portions of an image. Image inpainting is the process of patching a hole (e.g., missing pixels or undesirable pixels) or mask in an image with other pixels in order to replace a set of pixels with another set of pixels. Despite these advances, machine learning systems and other technologies suffer from a number of disadvantages, particularly in terms of their accuracy.

SUMMARY

One or more embodiments described herein provide benefits and solve one or more of the foregoing or other problems in existing technology with methods, systems, and non-transitory computer readable media that inpaint one or more portions of a target image based on merging (or selecting from) one or more warped copies of a source image (e.g. via a neural network model). This, among other functionality described herein, resolves the inaccuracies of existing image inpainting technologies.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present invention is described in detail below with reference to the attached drawing figures, wherein.

DETAILED DESCRIPTION

Overview

Figure 1:
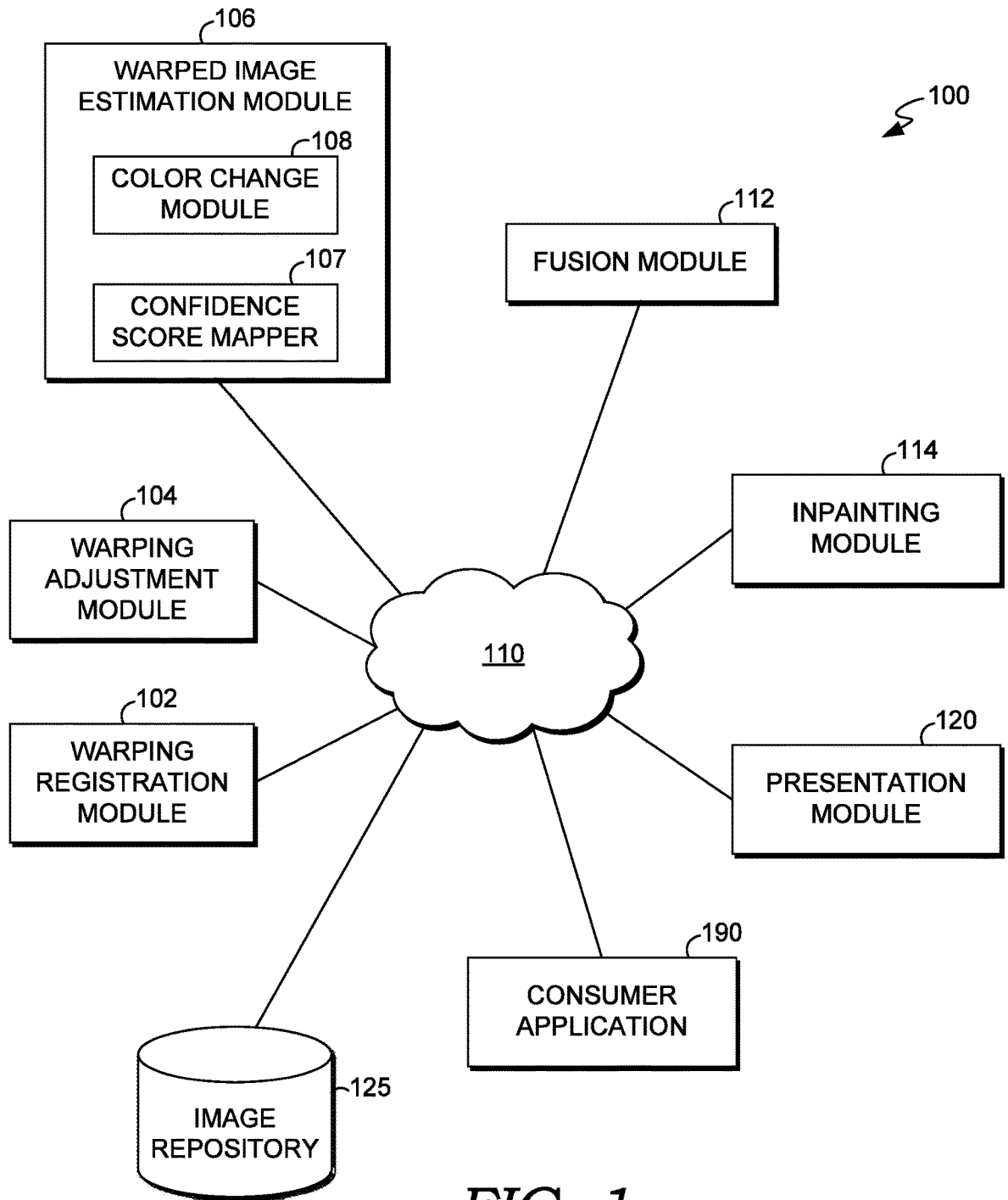
FIG. 1 is a block diagram of a computing system architecture in which aspects of the present disclosure are employed, according to some embodiments.

Users often desire to remove unwanted objects in images and replace them with pixels that seamlessly represent or match other portions of the images. In an illustrative example, a digital image of a popular geographical area may include undesirable pixels corresponding to vehicles, pedestrians, road signs, or other objects that make the popular geographical area look less aesthetically pleasing. As described above, certain inpainting technologies can patch the holes that define such unwanted objects with the goal of making the corresponding output image appear as though the unwanted objects never existed. However, because existing technologies are inaccurate, achieving such goal is difficult if not impossible.

Existing technologies can inpaint portions of images using functionality such as edges, segmentation masks, low-frequency structures, and other map-like depth features. In all of these techniques, image inpainting is performed by single image inpainting methods These technologies try to remove an undesired hole region from an output image so that the resulting image appears realistic either by copying or diffusing information from elsewhere in the same image into the hole or by making the hole region in the context of its surroundings appear statistically similar to other images in the same dataset. However, inpainting using a single image in these technologies causes inaccuracies when the holes are relatively large, irregular, or the images are high resolution. This is at least partially because quality image inpainting is difficult to achieve when only a single image is used.

Moreover, single image inpainting methods fail to resolve color mismatching issues. This is because different images can be taken from largely different exposure levels (or amount of light that reaches camera sensor), which makes various images lighter or darker depending on the exposure. Accordingly, for example, when single image inpainting or other methods incorporate the single input image content into the output image, both images may have vastly different exposure levels. This leaves the output image with a first exposure level of the original image, with a patched-in second exposure level of content. This may inadvertently outline the undesirable object or set of unwanted pixels, thereby leading to a low quality output image.

Existing technologies also fail to accurately perform image inpainting when images are captured from different angles, planes, or viewpoints. When this occurs, there are likely to be parallax issues. Parallax is the apparent displacement of an object because of a change in an observer's or image capturing device's (e.g., a camera's) point of view. For example, a first image of a neighborhood captured by a drone will be much different than a second image of the same neighborhood captured by a person standing at the neighborhood street due to the angle of image capture. A house (the object) in the neighborhood may take on a completely different look in the first image relative to the second image. Accordingly, for example, when technologies patch a logical hole in the first image, they may have to use only the second image to do so, but since the same content is taken from very different perspectives, the output image will be inaccurate.

Various embodiments of the present invention improve these existing technologies through new functionality that improves accuracy relative to these technologies, as described herein. Particular embodiments relate to inpainting one or more portions of an image based on merging (or selecting) one or more portions of a warped image with (or from among) one or more portions of another image (e.g., via a deep learning model). A "warped" image, as described herein, is an image where at least a portion of the content or pixels of a source image have been transformed in some way. This transformation typically occurs when content or pixels have changed location (e.g., as opposed to changing mere pixel values, such as in filtering) from an original source image to a warped image. For example, a first source image can include a set of pixels representing a car. A warped image can be generated by applying a "rotation" transformation parametrically to the entire first source image such that the pixels representing the car (and the rest of the source image) change their positioning, thereby indicating the rotation transformation.

In an illustrative example of image inpainting according to some embodiments, a user may have captured a target image of a first geographic area that she likes more relative to one or more other source images of the same first geographic area. Such other source images may be obtained from the user's local camera album or remote online image resources. Each of these images, both target and source(s), may correspond to different planes, views, angles, perspectives, and the like of the same first geographic area. However, the target image may contain occlusions representing an object (e.g., a car) that the user does not like because it covers a majority of the first geographic area. Responsively, the user, using a consumer application, may request removal and inpainting of the set of pixels representing the object via a lasso gesture and/or other user input to select the set of pixels. In response to receiving this request, particular embodiments can generate different warped images of the one or more source images (e.g., via clustering feature points between target and source images to estimate one or more homographies within each clustered group). Such functionality allows the alignment of specific regions of the source image(s) (or warped images) with corresponding regions of the target image so that they can be adequately merged or used for inpainting. For example, a first warped image may represent a first source image of the geographical area that includes a parametric "affine" warp transformation. A second warped image may represent the first source image, except that it includes a parametric "cylindrical" warp transformation. Accordingly, both affine and cylindrical warp transformations can be merged (e.g., via a Softmax2D), as described in more detail herein. Responsively, based at least in part on the merging or selecting of these warped images, particular embodiments can then cause an inpainting of a logical hole that represents the object.

Some embodiments additionally apply more granular warping on these already-warped images to adjust very small misalignment issues between a target image and one or more source images (or warped images) for better alignment. For example, some embodiments apply one or more deep-learning neural networks to learn a pixel-level warping field to adjust the small misalignment issues. For instance, even after generating warped images, there may be small misalignment between a target image and a warped source image around a hole or along masked boundary regions. Some embodiments use one or more convolutional neural networks (e.g., U NET and/or a Transformer network (STN)), or other learning algorithm to apply this more granular warping.

Some embodiments additionally or alternatively estimate a color or exposure level difference between the target image and one or more source images (or warped images) prior to merging or selecting from a warped image so that the inpainted portion matches the color or exposure level of the target image. For example, some embodiments generate or estimate a color changing map for each warped source image, where the color changing map indicates the color or exposure level difference (e.g., for each pixel) between the target image and the source image. Some embodiments additionally change the source image pixel color values and/or exposure levels in response to the color or exposure level difference being outside of a threshold to match the pixel color values and/or exposure levels of the target image so that there are no apparent differences between the color values and/or exposure levels between the inpainted content (the image masks) and the rest of the target image.

Various embodiments of the present disclosure improve the existing technologies and others described above by at least merging or selecting from a warped image for image inpainting. This improves the accuracy of image inpainting relative to other technologies. As described above, existing technologies fail to adequately patch holes when those holes are too large or irregular, when there are unique occlusions, and when there are parallax issues. However, particular embodiments accurately inpaint one or more portions of an image, even if the logical holes are large or irregular, and even if there are occlusion or parallax issues. This is because the generation, merging, and/or selection of a warped image causes a higher probability that the pixels or inpainted content covering the holes will match or have the correct content according to the rest of the target image. For example, a target image can include a building (that is occluded by an object) at a first angle and a source image can include the same building, except at a completely different angle. Various embodiments can warp the source image such that the set of pixels representing the building can appear similar to the building at the first angle, as indicated in the target image. Responsively, embodiments can then use the warped pixels to inpaint the hole of the target image so that the building appears as though there has been no occlusion.

Exemplary System

Referring now to FIG. 1, a block diagram is provided showing aspects of an example computing system architecture suitable for implementing an embodiment of the disclosure and designated generally as the system 100. The system 100 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1000 of FIG. 10). Alternatively, some or each of the components may be distributed among various computing devices, such as in a distributed cloud computing environment. In some embodiments, the system 100 and each of the components are located within the server and/or user device of FIG. 9, as described in more detail herein.

The system 100 includes network 110, which is described in connection to FIG. 9, and which communicatively couples components of system 100, including the warping registration module 102, the warping adjustment module 104, the warped image estimation module 106, the fusion module 112, the inpainting module 114, the presentation module 120, the consumer application 190, and the image repository 125. The components of the system 100 may be embodied as a set of compiled computer instructions or functions, program modules, computer software services, logic gates, or an arrangement of processes carried out on one or more computer systems.

The system 100 generally operates to inpaint one or more portions of one or more images. In some embodiments, thy system 100 generates content inside masked regions (e.g., holes) of a target image by using contents of one or more warped source images and/or the results from the single-image inpainting algorithms to patch or fill in the mask. An "image" as described herein is a visual representation of one or more portions of the real world or a visual representation of one or more documents. For example, an image can be a digital photograph, a digital image among a sequence of video segments, a graphic image file (e.g., JPEG, PNG, etc.), a picture (or sub-element of a picture), and/or a bitmap among other things. A "mask," or "masking" as described herein refers to hiding one or more layers or pixels in the target image and/or revealing one or more layers or pixels from a warped source image to patch the target image. In some embodiments, a mask is a matrix of values that represents a particular object associated with a logical hole, where a value of 1 represents the logical hole or object requested to be removed, and the rest of the image includes a 0 value. For example, a mask can include or represent an undesirable street sign object in an image.

The warping registration module 102 is generally responsible for generating one or more warped images using one or more source images as input. Accordingly, the warping registration module 102 applies one or more transformations to one or more source images to generate one or more output warped images. A "source image" as described herein refers to a particular image that is a candidate to use to inpaint one or more portions of a target image. A "target" image as described herein refers to an image that includes one or more portions that need to be (or have been requested to be) inpainted. "Image Inpainting" refers to reconstructing a set of content (e.g., pixels) of a target image. Such reconstruction may include patching a particular logical hole and/or masking a region in the target image with a set of pixels. Image inpainting alternatively or additionally refers to a process where damaged, deteriorating, or missing content of an image is filled in to present a complete target image.

Each warping functionality to make a warped image includes mapping a destination (e.g., X, Y coordinates) for a set of pixels in an output image (e.g., a warped image) from a set of corresponding pixels of every input image (e.g., a source image). Warping thus includes changing the "domain" (e.g., spatial domain) or position coordinates of a set of pixels from a first position in a source image to a second position in a warped image, and not the "range" or pixel intensity values (e.g., red color to blue color) of an image. At a high level, warping an image typically includes digitally manipulating or transforming an image such that one or more pixels representing one or more objects within a source image have been distorted (e.g., widened, narrowed, shrunk, etc.), where the distortion represents a warped image. In some embodiments, mapping such destination or domain of the warping function includes parametrically warping source images. A "parametrically warped image" is a warped image where the particular warping mapping is based on one or more parameters (e.g., predefine parameters) that are globally applied to all pixels of an object of a source image or only locally applied to some pixels of a source image. For example, transformation T is a coordinate-changing function P'=T(p). Accordingly, T is the same for any point P or set of pixels and can be described by a few parameters. Examples of specific parametric warping includes: translation, rotation, aspect, affine, perspective, or cylindrical.

In an example illustration of the output of the warping registration module 102, a user may request to inpaint a portion of a target image. The user may have also downloaded a source image. In response to the request, the warping registration module 102 may generate a first warped image by applying a perspective warp to the source image.

In some embodiments, before producing a warped image, the warping registration module 102 maps one or more homographies between the target image and one or more source images. A "homography" refers to a transformation data element or structure (e.g., a 3×3 matrix) that maps points in one image (e.g., a target image) to corresponding points in another image (e.g., a source image). For example, a first set of pixels representing a first edge of a book in a target image can be mapped to a second set of pixels representing the same first edge of the book in a source image. In this way, pixels in different images representing the same object can be identified. Such homography mapping can be performed as follows:

$$H = \begin{bmatrix} h_{00} & h_{01} & h_{02} \\ h_{10} & h_{11} & h_{12} \\ h_{20} & h_{21} & h_{22} \end{bmatrix}$$

For a first set of corresponding points $(X_1, Y_1)$, in a target image, and $(X_2, Y_2)$, in a source image, then homography H, in particular embodiments, maps the corresponding points in the following way:

$$\begin{bmatrix} x_1 \\ y_1 \\ 1 \end{bmatrix} = H \begin{bmatrix} x_2 \\ y_2 \\ 1 \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_2 \\ y_2 \\ 1 \end{bmatrix}$$

In some embodiments, in order to generate this mapping, machine learning models, such as a first deep learning model (e.g., an OANet CNN) can be used. In various embodiments, the terms "deep embedding neural network," "deep learning model," "deep neural network," "deep network," or the like refers to one or more machine learning algorithms that use multiple layers to extract features from input. In most cases, a deep network refers to a specific type of neural network machine learning model is capable of embedding feature vectors representing features in feature space based on similarity or distance (e.g., Euclidian distance, cosine distance, Hamming distance, etc.). For example, these terms can refer to a Convolutional Neural Network (CNN) (e.g., an inception v3 model), Recurrent Neural Networks (RNN) (e.g., LSTM), Recursive Neural Networks, Unsupervised Pretrained Networks (e.g., Deep belief Networks (DBN), or the like.

Certain CNNs can efficiently establish the correspondences between a target image and one or more source images. It is understood that homographies are representative only, and that alternative functionality or data may be determined to map or match features between target and source images. For example, instead of defining projective space through homographies, the projective space can be defined through a set of axioms, lines (e.g., line segments), collineations (e.g., projective collineations), or other data elements, which do not explicitly involve any field (e.g., synthetic geometry).

In some embodiments, in response to this mapping of the homographies or data elements, particular embodiments group the corresponding points (or data elements) into one or more clusters (e.g., via an agglomerative clustering method). In some embodiments, within each group or cluster, a single homography (or other data element) is then estimated in order to register an image around a given region corresponding to a pixel set in an image, which is described in more detail below. In some embodiments, in response to the registering using the single homography, a given source image is warped or transformed using the estimated single homography for each region in order to obtain a set of warped images. This causes each warped image to align with specific regions of the target image in preparation for image inpainting.

In some embodiments, the warping registration module 102 includes or uses a training component (e.g., a CNN) that trains a set of images (in the image repository 125) so that various image features are learned or weighted by a machine learning model. In this way, for example, prior to one or more portions of a target image being mapped to corresponding features of the source image(s) by the warping registration module 102, the pixels representing identified objects can be first learned through training. In another example, when homographies or other data elements are clustered, they can be clustered based on training.

In another illustrative example of a training component, some embodiments learn an embedding of feature vectors based on deep learning to detect similar features between target and source images in feature space using distance measures, such as cosine (or Euclidian) distance. For example, each labeled image is converted from string or other form into a vector (e.g., a set of real numbers) where each value or set of values represents the individual features of the image in feature space. Feature space (or vector space) is a collection of feature vectors that are each oriented or embedded in space based on an aggregate similarity of features of the feature vector. Over various training stages or epochs, certain feature characteristics for each labeled image feature can be learned or weighted. For example, for a first image object (e.g., an orange), the most prominent feature can be the circular shape, whereas other features change considerably or are not present, such as the size or color. Consequently, patterns of shape can be weighted (e.g., a node connection is strengthened to a value close to 1), which is indicative of the label taking on this feature. In this way, embodiments learn weights corresponding to different features such that similar features found in images contribute positively to a mapping between target and source images.

The warping adjustment module 104 applies additional or finer-grained warping than that of the warping registration module 102. For example, the warping adjustment module 104 can apply a second deep learning model (separate from the one applied from the warping registration module 102) to learn a pixel-level warping field (as opposed to an image-level warping) to further adjust small misalignment issues between pixels representing an object even after warping has been performed by the warping registration module 102. For instance, a homography-warped source image (i.e., a warped image) may have some misalignment in the mask boundary regions that define the outer edge of a logical hole. Although a warped image will be possibly aligned after the warping registration module 102 performs its functionality, there may still be some small misalignment between a target image and one or more source images, especially around the masked regions. Some embodiments use a shallow UNET CNN and a Spatial Transformer Network (STN) to make further warping adjustment, which is described in more detail below.

In an illustrative example of the warping adjustment module 104, using the example above, the second warped image that indicates a cylindrical warp to the source image may have misalignment between pixels representing a small object (e.g., tire spokes). Accordingly, the warping adjustment module 104 better aligns the pixels so that there are fewer or no misalignment pixels.

The warped image estimation module 106 is generally responsible for estimating a color difference between target and source images (i.e., the pixel values) and weights the pixels in the warped images, where the weighting corresponds to choosing how warped images and/or other inpainting candidates are merged (or selected from) for inpainting the hole of the target image. In some embodiments, the higher the weight that pixels carry, the more likely corresponding features will be present in a mask at merging time or inpainting time. In some embodiments, the higher weights corresponds to pixel regions of the warped images that are well-aligned for regions within the target image. For example, using the illustration above the target image may have been taken at a particular perspective view. However, an original source image may have been taken at a perspective different than the target image. Notwithstanding this, the warped image that includes the "perspective" warp may match or be within a threshold difference relative to the perspective of the target image. Accordingly, most regions of the "perspective" warped image may be weighted higher with a higher confidence score and therefore be used as the inpainting mask to fill in the corresponding hole (e.g., via the fusion module 112).

The color change module 108 estimates the color-wise difference between a target image and one or more source images and modify an inpainting mask based on the color difference. For example, as described herein some embodiments estimate a color changing map for each source image, where the color changing map indicates the color or exposure level difference (e.g., for each pixel) between the target image and the source image. Some embodiments additionally change the source image pixel color values and/or exposure levels in response to the color or exposure level difference being outside of a threshold to match the pixel color values and/or exposure levels of the target image so that there are no apparent differences between the color values and/or exposure levels between the inpainted content (the image masks) and the rest of the target image.

The confidence score mapper 107 is generally responsible for determining a confidence score of each warped image and/or other inpainting candidate to determine what warped image/inpainting candidate to merge and/or select from. An "inpainting candidate" as described herein refers to any potential mask or set of pixels that is a candidate to cover or fill in a hole. For example, an inpainting candidate can be one or more portions of a warped image or one or more portions of a single inpainted image. A "single inpainted image" or "single image inpainting" as described to herein refers is a target image where the hole is filled using content from the same target image (e.g., pixels surrounding the hole in the target image). Additionally or alternatively, a single inpainted image or single image inpainting refers to when the only available input to an inpainting system is the target image itself (and not any source image). In some instances, a model can use either the image pixels of the target image itself like Photoshop CAF, or learned/memorized features from the large-scale training data like ProFill.

The determining of the confidence score via the confidence score mapper 107 is indicative of determining how suitable a given mask, inpainting candidate, or warped image is for image inpainting of one or more portions of a target image. In some embodiments, the confidence score mapper 107 determines the pixel regions that are well-aligned between the target image and the one or more source images (e.g., via the weighting described above).

In some embodiments, the fusion module 112 merges (e.g., combines, fuses, integrates) one or more portions of a warped image with one or more portions of an inpainting candidate based on the warped image estimation module 106 functionality in preparation for inpainting. Alternatively, in some embodiments, the fusion module 112 selects one or more portions of a warped image or one or more portions of an inpainting candidate based on the warped image estimation module 106 functionality in preparation for inpainting. For example, embodiments can select only the inpainting candidate for inpainting (and not the warped image) based on the confidence score for the inpainting candidate being higher.

In some embodiments, the fusion module 112 fuses or merges all the N+1 candidate warped sources images together. In these embodiments, a merging operation (e.g., Softmax 2D) is selected to normalize the confidence scores generated by the warped image estimation module 106. Then the warped images are merged or selected. For example, using the illustration above, because the warped image that includes the "perspective" warp matches or is within a threshold difference relative to the perspective of the target image, most regions of the "perspective" warped image may be weighted higher with a higher confidence score. Based on this high confidence score and weights, in some embodiments this perspective warped image may be selected for inpainting (by the inpainting module 114). Alternatively, in some embodiments, features of this perspective warped image is present for most of the merged final merged image based on the high weights.

In some embodiments, the fusion module 112 also merges the color differences between the warped source images and/or inpainting candidates to match the color or exposure level of the target image.

The inpainting module 114 inpaints one or more portions of a target image using contents from one or more warped images and/or other inpainting candidates (e.g., a single image inpainting). In some embodiments, the inpainting by the inpainting module 114 is based on the fusion module 112 and warped image estimation module 106 functionality. For example, using the illustration above, based on this high confidence score and weights of the perspective warped image, in some embodiments, this perspective warped image may be selected for image inpainting such that the inpainting module 114 actually applies one or more portions of the perspective warped image to the holes or mask in the target image. Alternatively, the inpainting module 114 applies one or more portions of a merged image to a mask or hole of the target image. A "merged image" refers to an image that combines one or more portions of a warped image and one or more other portions of an image candidate. For instance, using the illustration above, the perspective warped image can be merged with the cylindrical warped image to form an image with a combination of perspective and cylindrical warps (e.g., which includes more perspective warps based on the weights), such that the image inpainting applies one or more portions of the merged warped image to the holes or mask in the target image.

The presentation module 120 is generally responsible for presenting content (or causing presentation of content) and related information to a user, such as an inpainted target image. Presentation module 120 may comprise one or more applications or services on a user device, across multiple user devices, or in the cloud. For example, in one embodiment, presentation module 120 manages the presentation of content to a user across multiple user devices associated with that user. Based on content logic, device features, and/or other user data, presentation module 120 may determine on which user device(s) content is presented, as well as the context of the presentation, such as how (or in what format and how much content, which can be dependent on the user device or context) it is presented, when it is presented. In particular, in some embodiments, presentation module 120 applies content logic to device features, or sensed user data to determine aspects of content presentation.

In some embodiments, presentation module 120 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation component 220 can cause presentation of a target image with inpainted masks as performed by the inpainting module 114. The presentation module 120 can additionally or alternatively cause presentation of other contextual data or metadata, such as timestamps of when an image was uploaded, source images, UI elements for users to manipulate target images, and the like.

Consumer applications 190 generally refers to one or more computer applications or services, such as online/cloud applications or locally stored apps that consume, include, or utilize some or each of the components of the system 100. In particular, a consumer application 190 may receive both a target image and one or more source images in order to inpaint one or more portions of the target image using the one or more source images or other inpainting candidates, as described within the system 100. In some embodiments, a consumer application 190 may utilize the presentation module 120 to cause presentation of inpainted target images (e.g., as performed by the inpainting module 114). Examples of consumer applications 290 may include, without limitation, computer applications or services for presenting media and/or editing media (e.g., Adobe® Photoshop®, Adobe After Effects®, and Adobe Premiere®), or other computer applications that include such functionality, such as social media service applications (e.g., PINTEREST, FACEBOOK, etc.), email, messaging, chat, or any other web application, plugin, extension, or locally stored application.

The image repository 125 can represent different images (e.g., labeled images) that have been used to train deep networks or other machine learning models, as described above. Additionally or alternatively, the image repository 125 can include one or more target images and/or one or more source images.

Figure 2:
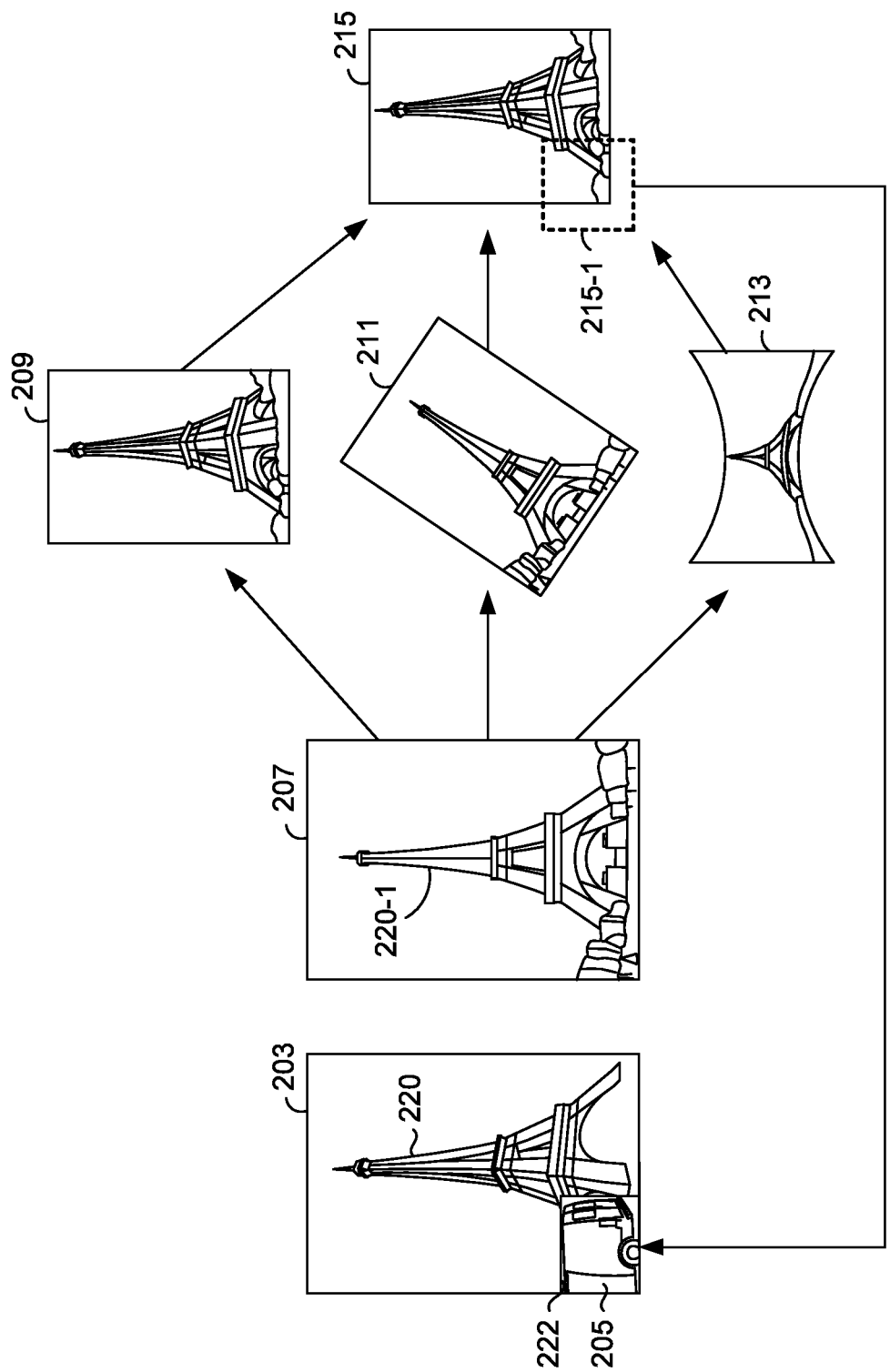
FIG. 2 is a schematic diagram visually illustrating how a target image is inpainted, according to some embodiments.

Turning now to FIG. 2, a schematic diagram visually illustrating how a target image 203 is inpainted, according to some embodiments. The target image 203 includes content representing various objects, such as the tower 220 and the vehicle 205. As illustrated in FIG. 2, the tower is partially occluded by the vehicle 205. A user may wish to remove pixels representing the vehicle 205 from the target image 203 and inpaint the corresponding logical hole or mask 222. Accordingly, the user (e.g., using the consumer application 190) may request an inpainting of the set of pixels representing the vehicle 205. The user or other component (e.g., an image inpainting service) may have also provided the source image 207 (e.g., to the consumer application 190). For example, the source image 207 may be uploaded to the consumer application 190 from the user's local image album, or from a web resource, such as a web application or web browser. As illustrated in the source image 207, the tower object 220-1 is the same object as the tower object 220 as illustrated in the target image, except that the source image 207 has captured the tower object 220-1 from a different angle relative to the tower object 220 in the target image. Further, the vehicle objet 205 is not included in the source image 207.

In various embodiments, in response to receiving the user request to inpaint the masked portion 222 of the target image 203, particular embodiments automatically generate various warped images. It is understood that in some embodiments, in response to this user request (or upload of the source image 207), the generation of the warped images 209, 211, 213, and 209, as well as the image inpainting of the mask 222 is automated (done without an explicit user request). As illustrated in FIG. 2, particular embodiments generate three warped images 209, 211, and 213 by applying three different warping mappings to the source image 207. It is understood that the three different warped images 209, 211, and 213 are illustrative only and that any quantity or type of warping can occur. Moreover, as described in more detail below (e.g., in FIG. 3), in some embodiments, the type of warping functionality used is based on feature point clustering to better align objects or portions of the source image 207 with the target image 203. Accordingly, some embodiments select the type of warping that best fits objects in the target image 203.

In some embodiments, the warping occurs through the functionality as described with respect to warping registration module 102 and/or the warping adjustment module 104. Specifically, particular embodiments warp the source image 207 using a "perspective" parametric warp to arrive at the warped image 209. As illustrated in the warped image 209, the tower object 220-1 has been transformed such that the tower object appears to be in similar orientation, perspective, and plane relative to the tower object 220-1, as indicated in the source image 207. Particular embodiments further warp the source image 207 using a "rotation" parametric warp to arrive at the warped image 211. The "rotation" warp applies a rotation of the source image 207, such that all corresponding pixels are tilted in an upper-left position. Particular embodiments further warp the source image 207 using a "cylindrical" parametric warp to arrive at the warped image 213. The "cylindrical" warp condenses pixels towards the center of the image 213 and also expands or stretches pixels toward the sides or edges of the image 213.

In response to the generating of the multiple warped images 209, 211, and 213, some embodiments merge (or select one of) the warped images 209, 211, and 213, where the output is a single warped image 215. Some embodiments additionally or alternatively merge any one of the warped images 209, 211, and/or 213 with any other inpainting candidate, such as a single inpainted image. In some embodiments, such merging or selecting is performed as described with respect to the fusion module 112 and the warped image estimation module 106. Some embodiments merge features from the warped images 209, 211, and 213 into a single warped image 215. For example, some embodiments generate pixels into the warped image 215 that match the pixel values and positions representing the tower object 220-1. Additionally, particular embodiments can generate pixels into the warped image 215 that match pixel values and positions of the rotation warped image 211 and the cylindrical warped image 213.

Some embodiments alternatively select one or more portions of the warped images 209, 211, and 213 that most closely matches the pixel orientation and/or pixel values of the target image (or pixel orientation/pixel values of all content surrounding the vehicle object 205). For example, the tower object 220-1 within the warped image 209 most closely resembles the pixel orientation of the tower object 220 in the target image 203. This is because the warp of the tower object 220-1 within the source image 207 causes the corresponding set of pixels to more closely resemble the particular perspective of the tower object 220 in the target mage 203, as illustrated in the warped image 209. In these selection embodiments, the output warped image 215 represents at least a portion of the pixels or content within one of the warped images 209, 211, 213. For example, if embodiments select the warped image 209, the warped image 215 represents or is the same as the warped image 209.

The window 215-1 represents the content, mask, or pixels within the image 215 that are used to patch or inpaint the logical hole or mask 222 within the target image 203. Accordingly, the window of pixels 215 is extracted from the image 215 and applied to the mask 222. Therefore, the final output image will be the target image 203, except with the window of pixels 215-1 now included in the mask region 222. In this way, the vehicle object 205 is no longer visible and has been replaced with the window of pixels 215-1. In some embodiments, the window of pixels 215-1 is determined by generating homographies between the image 215 and the target image 203 or other feature matching, as described with respect to the warping registration module 102. In this way, features (e.g., the tower object 220-1) from the image 215 can be mapped to corresponding features (e.g., the tower object 220) of the target image 203. Some embodiments alternatively replace the entire target image 203 with the corresponding warped image 215 such that the warped image 215 is the final output image.

Figure 3:
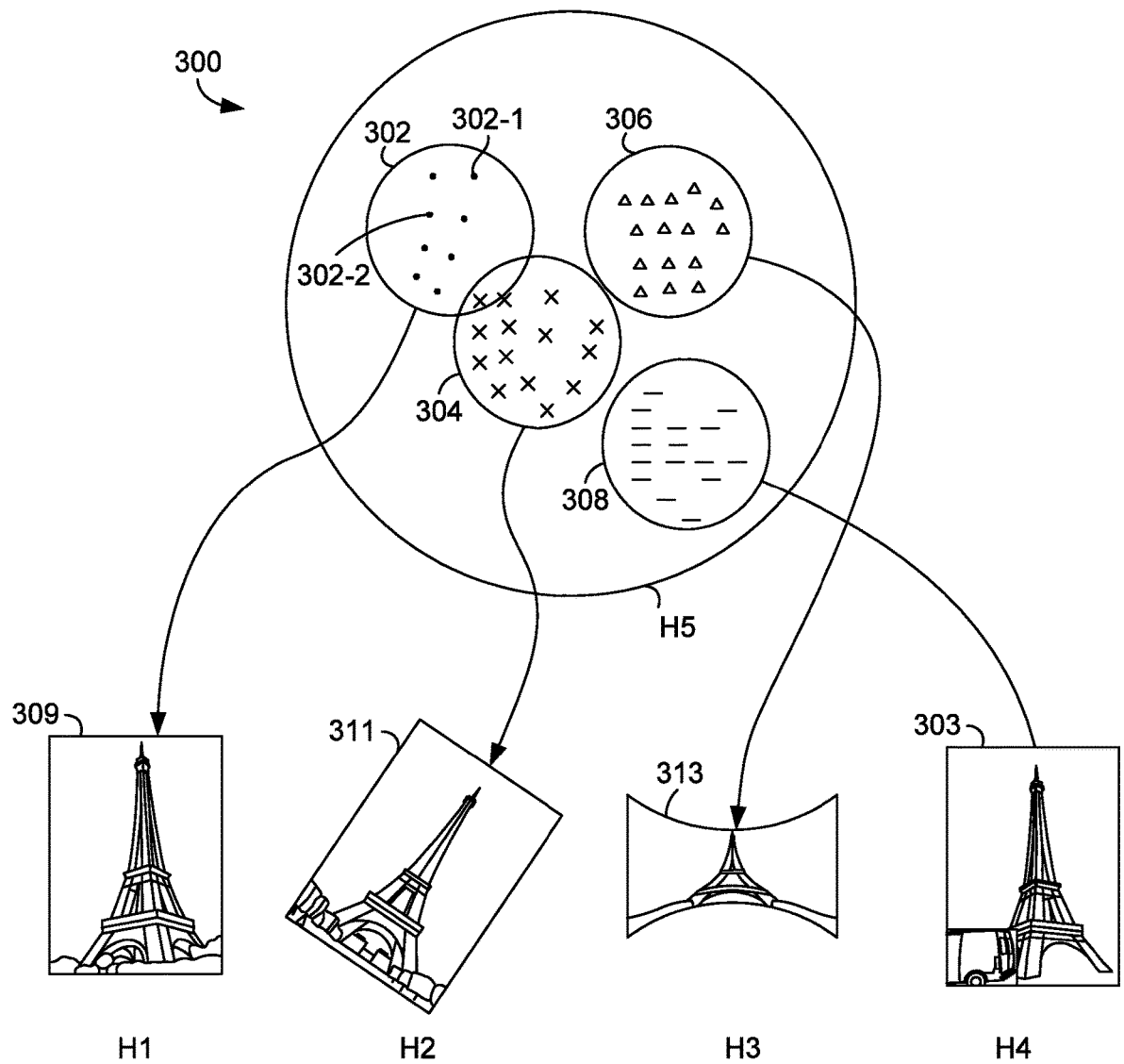
FIG. 3 is a schematic diagram illustrating how one or more source images can be warped to generate a warped image, according to some embodiments.

FIG. 3 is a schematic diagram illustrating how one or more source images can be warped to generate a warped image, according to particular embodiments. In some embodiments, the functionality described with respect to FIG. 3 is functionality performed by the warping registration module 102. In some embodiments, the images 309, 311, and 313 respectively represent the warped images 209, 211, and 213 of FIG. 2. In some embodiments, the images 309, 311, and 313 represent source images that have not yet been warped.

FIG. 3 illustrates that given a target image 303 and the source images 309, 311, and 313, particular embodiments estimate the matched feature points between the images and cluster the points into different groups or clusters. In some embodiments the "feature points" as described herein does not represent any object in an image in an image embedding manifold but represents landmark points or coordinates within the source image(s) that are used to warp a source image using the landmark points as reference points. For example, feature points 302-1 and 302-2 (e.g., homographies) are clustered to group 302, representing feature points of the image 309. Likewise, clusters 304 and 306 include a group of feature points, where the clusters 304 and 306 represent the image 311 and 313 respectively. Likewise, cluster 308 includes a group of feature points representing features of the target image 303. Certain embodiments use distance (e.g., Euclidian or cosine distance) between the feature points and/or clusters (e.g., a centroid of the cluster) to determine similarity between the points or clusters. For example, referring back to FIG. 2, features of the tower object 220 in the target image 203 may be represented in the cluster 308, whereas features of the tower object 220-1 within the perspective warped image 209 may be represented within the cluster 304. Accordingly, as illustrated in FIG. 3, the cluster 304 or corresponding features may be closer to cluster 308 relative to any of the other clusters 302 or 306. Based on this distance, various embodiments combine and/or select warped images, as illustrated with respect to the image 215 of FIG. 2 and the fusion module 112 of FIG. 1. For example, because cluster 304 is closer to cluster 308, the warped image 209 will be selected (or its weights are higher) to generate the output image 215.

Some embodiments perform a multi-homography estimation pipeline to obtain multiple transformations (or warped images) of one or more source images. In various embodiments, each homography-transformed source image (i.e., warped image) will align specific regions of the one or more source images (309, 311, 313) with corresponding regions of the target image 303. This addresses multi-depth, perspective, planes, and parallax issues inside a hole or mask, as described herein.

Various embodiments of the present disclosure are described in terms of a target image $I_t$ (e.g., the target image 203) an associated mask M, and an arbitrary source image $I_s$ (e.g., source image 209). M indicates the logical hole region(s) (e.g., the mask 222). In some embodiments, M includes pixel values of one, and the rest of the pixels within a target image (e.g., the target image 203), with values of zero. As described above, various embodiments of the present disclosure generate content inside the masked region or hole of $I_t$ by reusing contents of $I_s$.

In some embodiments, FIG. 3 illustrates that particular embodiments estimate multiple homography matrices to transform or warp $I_s$ to align them with the masked target image $I_t^M = (1-M) \odot I_t$ to obtain different transformation matrices. Particular embodiments extract features from $I_t^M$ and $I_s$, and feed these extracted feature landmarks and their descriptors into a machine learning model (e.g., an OANet) for outlier rejection. In some embodiments, such features represent scale-invariant feature transform (SIFT) features. Accordingly, particular embodiments can detect and describe various local features in images. For example, referring back to FIG. 2, embodiments, using SIFT algorithms, can detect the tower object 220 of the target image 230. Various machine learning algorithms, such as OANet, efficiently establishes corresponding points between $I_t^M$ and $I_s$ by considering the order of the points in the global and local context. In response to obtaining the inliers of all the matched points set P, particular embodiments group these points into N subsets $\{P_j\}$, $j \in [1; N]$ using a clustering technique (e.g., agglomerative clustering), where $P = U_{j=1}^N P_j$ and N is the quantity or number of homographies that are explored. For example, as illustrated in FIG. 3, points 302-1 and 302-2 have been grouped into subset or cluster group 302 and other points have grouped into the cluster groups 304 and 306.

As illustrated in FIG. 3, the N+1 homography matrices are totally estimated using $P_j$ and P, denoted by $H_i$, $i \in [1, N+1]$. In some embodiments, the order of the homography matrices is random. In some embodiments, in response to the clustering of points into groups and associating the points between the target image $I_t$ and source image $I_s$, as illustrated in FIG. 3, particular embodiments warp (e.g., via the warping registration module 102) the source image $I_s$, using the estimated $H_i$, (e.g., "H4") to obtain a set of warped source images (e.g., warped images 309, 311, and 313) $\{I_s^i\}$, where $i \in [1, N+1]$. In some embodiments, within each cluster group, a single homography is estimated to register the image around any particular region or set of pixels. FIG. 3 illustrates one example when N=5. The three transformed or warped images 309, 311, and 313 each align with the masked target image based on some regions within the images decided by the points (e.g., the points 302-1 and 302-2).

In some embodiments, different warped images can be provided to users and the users can select which image she wants to use for inpainting. For example, referring back to FIG. 2, the user can selection the warped image 209 as the image output in 215. Alternatively or additionally, in some embodiments the user could assist in the actual fitting of the warping models. For example, the user can select homography pairs of corresponding points, or use corresponding regions or lines (e.g., for feature learning or matching).

Figure 4:
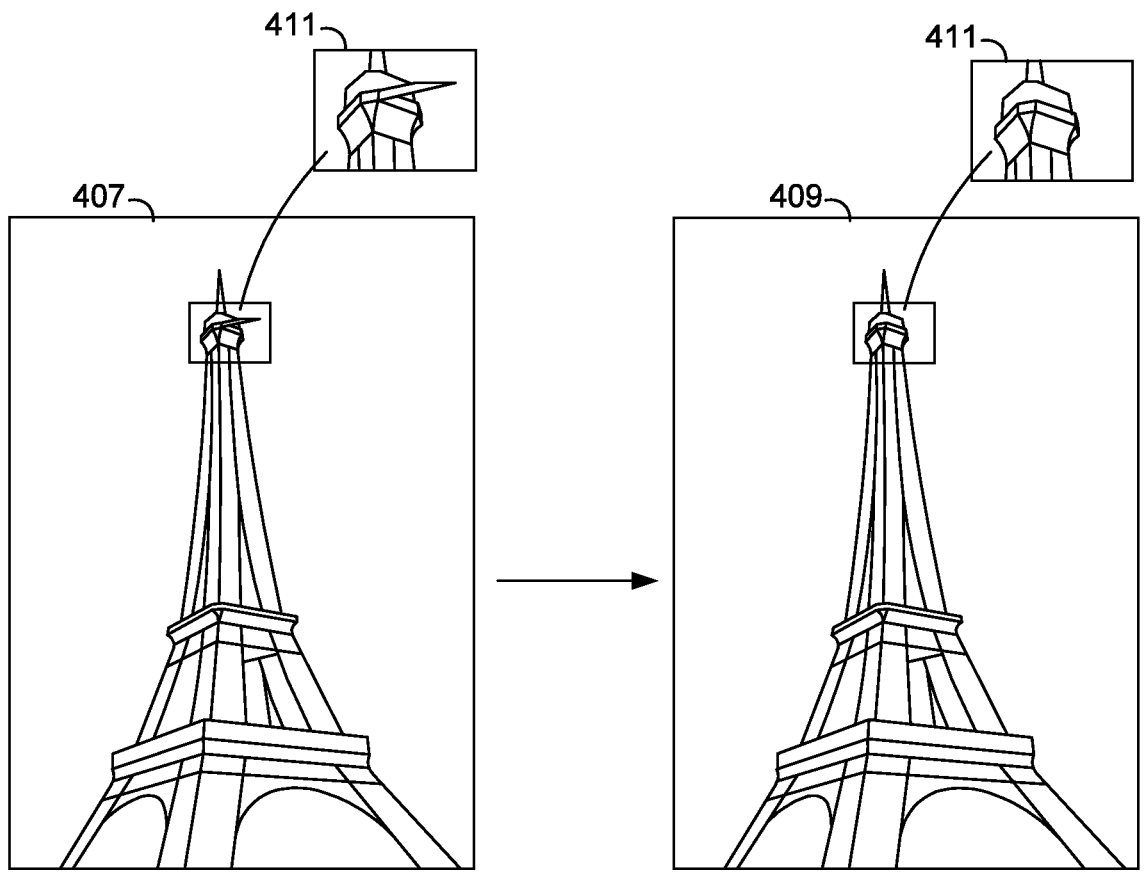
FIG. 4 is a schematic diagram that illustrates adjusting a warped image based on misalignment errors of a particular set of pixels or content, according to some embodiments.

FIG. 4 is a schematic diagram that illustrates adjusting a warped image based on misalignment errors of a particular set of pixels or content, according to some embodiments. As described herein, warping is the processing of changing pixel orientation or position (e.g., coordinates) from one image to another (i.e., from an original source image to a warped image). In some instances, the changing of the pixel orientation causes particular pixels to become misaligned in the warped image. Various embodiments of the present disclosure adjust or fix these misalignment issues such that the pixels are no longer misaligned, such as described with respect to the warping adjustment module 104. In some embodiments, the functionality described with respect to FIG. 4 occurs in response to the functionality as described with respect to FIG. 3.

As illustrated in FIG. 4, the set of pixels representing the object 411 within the warped image 407 are misaligned such that straight edges representing the object 411 are not even in alignment. Various embodiments of the present disclosure fix these alignment issues such that the same pixels representing the same object lines are aligned, as illustrated by the object 411 within the warped image 409. In some embodiments, such fixing of the alignment issues is performed by functionality as described with respect to the warping adjustment module 104. In some embodiments, the image 407 and/or 409 represent any of the warped images 209, 211, and/or 213.

In some embodiments, FIG. 4 represents functionality that learns a pixel-wise warping field for small misalignment adjustment. In various embodiments, the functionality of the alignment adjustment of FIG. 4 is performed via the following functionality. Even though each $I_s^i$ will be possibly aligned with $I_t$ after warping (e.g., by the warping registration module 102), there may still be some small misalignment between $I_s^i$ and $I_t^M$, especially around the masked or hole regions. As illustrated in FIG. 4, when the masked regions are directly filled using the transformed source image $I_s^i$ (i.e., a warped image), there are some misalignment issues along the mask boundary, as illustrated at the object 411 of the warped image 407. After further warping $I_s^i$ using the learning field, the boundary is better aligned, as represented by the pixels representing the line of the object 411 within the image 409.

Some embodiments (e.g., the warping adjustment module 104) perform the misalignment adjustment by using a CNN (e.g., a U Net) structure and Spatial-Transformer Network (STN). An STN performs a warping function (e.g., a different separate one relative to the warping performed at the warping registration module 102), but does so in a way that can be used by the CNN (or other deep network). Specifically, these embodiments take $I_t^M$, M, and a single $I_s^i$ as the inputs. Responsively, these embodiments learn to estimate the pixel-wise warping field along the vertical and horizontal directions as $W_X$ and $W_Y$. The warped source images after the refinement process can be denoted by $\hat{I}_s^i$ (e.g., the alignment adjusted warped image 409), $\hat{I}_s^i =$ Warp $(I_s^i; (W_x; W_y))$, where Warp(•;•) is the bilinear interpolation, which is differentiable. Each pixel in the warped image is some combination of one or more pixels in the image before the warping, where warp describes how to select those pixels. Responsively, the auxiliary loss to learn the warping field is defined by: $L_W^j = \|M_a \odot (I_t - \hat{I}_s^i)\|_1$, where $M_a$ is the availability mask indicating the region which is inside the pixel range of $I_s^i$. In some embodiments, to regularize the warping filed to be smooth enough, the total variance loss (i.e., $L_{wx}^i, L_{wy}^i$) is also optimized as follows, $$\mathcal{L}_{W_x}^i = \|\nabla_h W_x\|_2^2 + \|\nabla_v W_x\|_2^2,$$

$$\mathcal{L}_{W_y}^i = \|\nabla_h W_y\|_2^2 + \|\nabla_v W_y\|_2^2.$$

Figure 5:
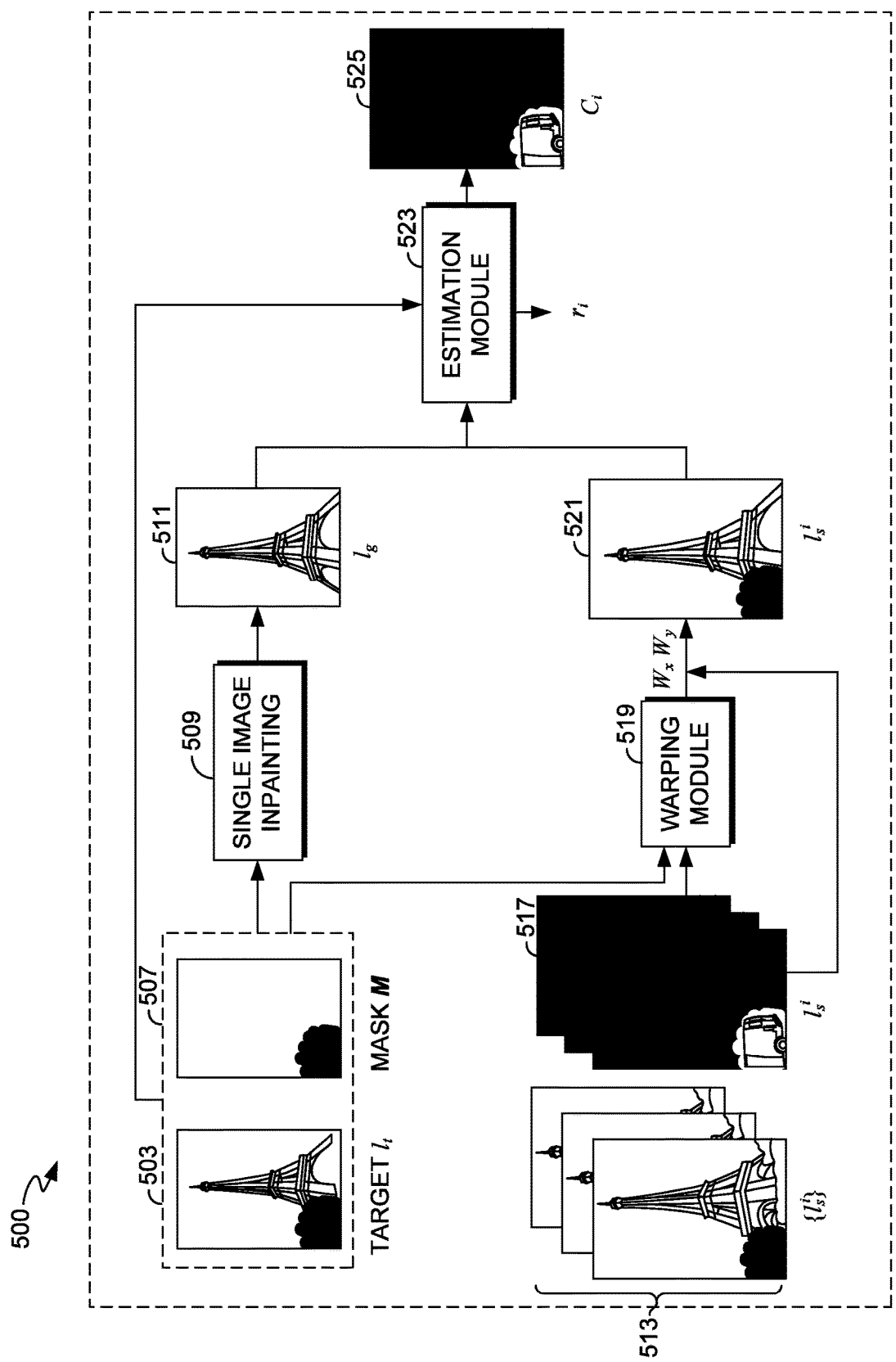
FIG. 5 is a block diagram of an example system for generating a confidence score for a warped image as the merging masks to combine one or more warped image candidates with the outputs from one or more other inpainting candidates, according to some embodiments.

FIG. 5 is a block diagram of an example system for generating a confidence score for a warped image as the merging masks to combine the warped image candidates and the outputs from one or more other singe image inpainting methods, according to embodiments. Accordingly, FIG. 5 illustrates estimating spatially-varying (more than one) pixel weights (indicating preference for particular pixels) for how to merge warped images and/or other inpainting candidates. In some embodiments, all functionality as described with respect to FIG. 5 is performed by the warped image estimation module 106. In some embodiments, the warping module 519 represents the warping registration module 102 and/or the warping adjustment module of FIG. 1. In some embodiments, the estimation module 523 represents the warped image estimation module 106. In some embodiments, the functionality described with respect to FIG. 5 occurs in response to the functionality as described with respect to FIG. 4.

FIG. 5 illustrates particular embodiments that estimates a confidence score map $C_i$ (i.e., 525) (e.g., via the confidence score mapper 107) and color changing map $R_i$ (i.e., 523) (e.g., via the color change module 108). The confidence map indicates the pixel regions that are well-aligned (or aligned within a threshold distance) and can be used for final generation (e.g., the pixels within the window 215-1). In some embodiments, such pixel regions ranges from zero to one, and higher-valued regions contain more informative and realistic pixels.

As illustrated in FIG. 5, a sigmoid layer is added to a warping functionality (e.g., as described with respect to the warping registration module 102 or FIG. 3) to active the confidence score map $C_i$. Various embodiments take $I_t^M$ (i.e., 503), M (i.e., 507), a single $I_s^i$ (i.e., 517) and $I_g$ (i.e., 511) as inputs, where $I_g$ is the output of existing single inpainting methods (i.e., 509) (e.g., PROFILL or Content-Aware Fill (MS CAF) of Photoshop). Some embodiments, train PROFILL or other inpainting methods and freeze the weights while training (e.g., the warped image estimation module 106). In various embodiments, the output confidence map $\hat{I}_s^i$ (i.e., 521) is set as $C_i$, (i.e., 525), and the pixel-wise color changing map is denoted as $r_i$. In some embodiments, the final merging output for $\hat{I}_s^i$ becomes, $$\hat{I}_s^i = I_t^M + M \odot (c_i \odot r_i \odot \hat{I}_s^i + (1-c_i) \odot I_g).$$

In various embodiments, the objective function according to FIG. 5 is defined as, $$L_E^I = \|M[(I_t - \hat{I}_s^i)]\|_1.$$

And an additional Total Variance loss is imposed on the confidence map, $$\mathcal{L}_c^i = \|\nabla_h c_i\|_2^2 + \|\nabla_v c_i\|_2^2.$$

Figure 6:
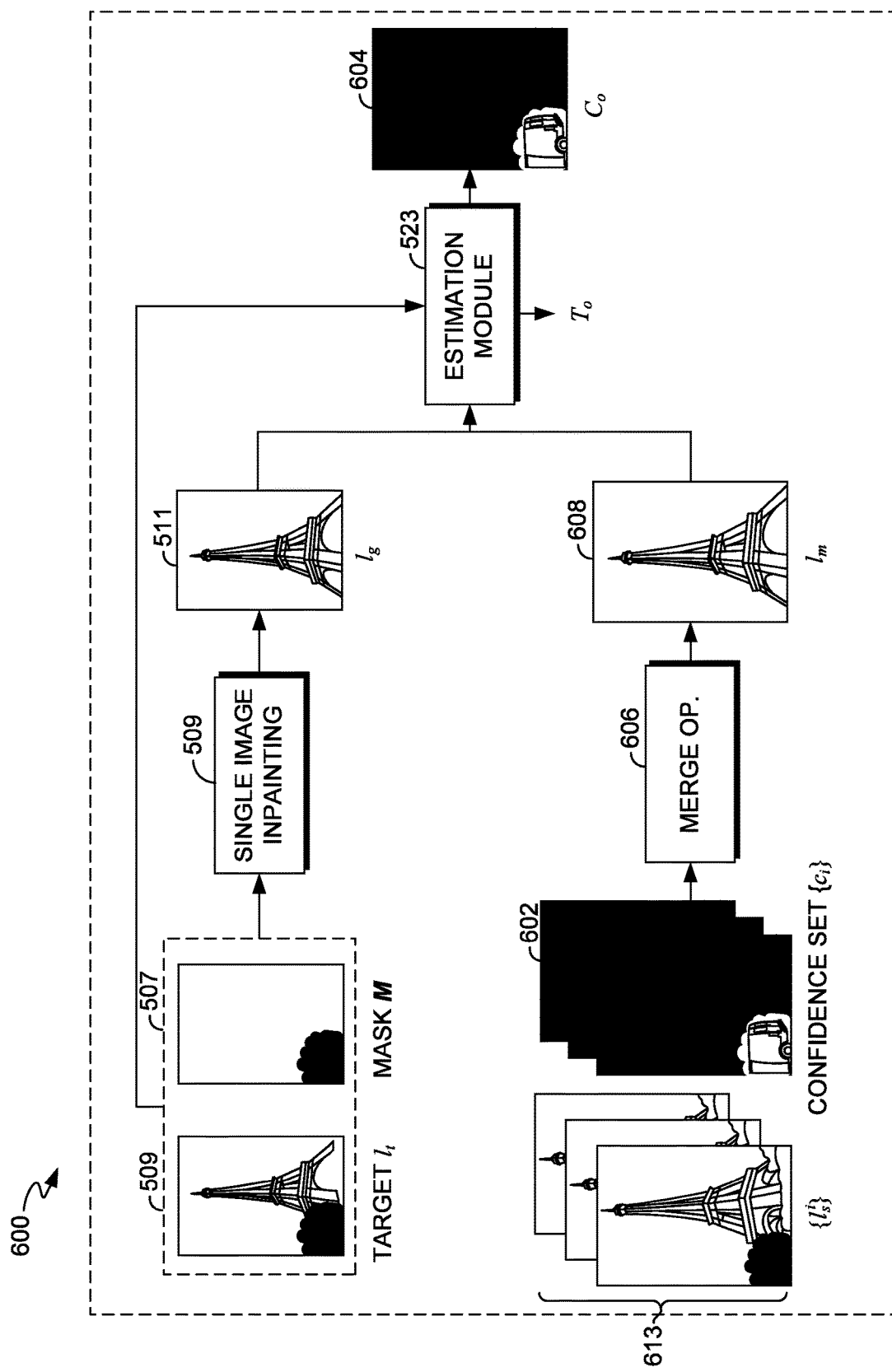
FIG. 6 is a block diagram of a system illustrating how a warped image and an inpainting candidate are merged, according to some embodiments.

FIG. 6 is a block diagram of a system 600 illustrating how one or more warped images and a single inpainting image are merged, according to various embodiments. In some embodiments, the system 600 represents functionality as performed by the fusion module 112. As illustrated, the system 600 includes some of the same components as illustrated in FIG. 6 (e.g., target image 503) because in some embodiments, FIG. 6 describes merging images based on the confidence score estimates of FIG. 5. Accordingly, in some embodiments, the functionality described with respect to FIG. 6 occurs in response to the functionality as described with respect to FIG. 5.

FIG. 6 illustrates that all warped image(s) and single inpainting image(s) are merged by learning fusion masks. For those regions that do not exist in the warped images (and/or source images), existing singe image inpainting methods are used to fill in the region. Accordingly, various embodiments learn the confidence sore of each warped image (e.g., the warped images 209, 2121, and 213) to determine which warped image (or portion of the warped image) to select (or weight higher than others) as the merging masks. Various embodiments merge the selected (or merged) warped images and the output from the existing single image inpainting methods.

FIG. 6 illustrates fusing or merging all N+1 candidate warped source images $\hat{I}_s^i$ (i.e., 521) together (e.g., warped images 209, 211, and 213) to arrive at the single warped image $I_m$ (e.g., image 215). Particular embodiments select a merge operation (e.g., Softmax 2D) to normalize all the confidence score maps $\{c\}$ (i.e., 602 or 525) estimated from $\{\hat{I}_s^i\}$ (i.e., 613) independently. Responsively, some embodiments merge $\hat{I}_s^i$ (i.e., 521) using the normalized confidence maps $\{\overline{c_i}\}$ by, $I_m = \Sigma_{i=1}^{N+1} \overline{c_i} \odot \hat{I}_s^i$. Some embodiments responsively feed this $I_m$ (i.e., 608) along with $I_t^M$ (i.e., 503) M (i.e., 507), $I_g$ (i.e., 511) back to the estimation module 523 again for final image merging. Accordingly, the final result becomes, $$I_o = I_t^M + M[(c_o \lfloor r_o \rfloor I_m + (1-c_o) \lfloor I_g \rfloor),$$

where $c_o$ and $r_o$ are the estimated confidence score maps respectively at the final merging step. In some embodiments, the final result (i.e., 604) is learned by the objective functions, $$L_o = VGG(I_t, I_o) + \|M_L((I_t - I_o))\|_1.$$

Therefore, the overall loss function becomes, $$\mathcal{L}_c^o = \|\nabla_h c_o\|_2^2 + \|\nabla_v c_o\|_2^2,$$

$$\mathcal{L}_{all} = \mathcal{L}_E + \lambda \mathcal{L}_o + \sum_{i=1}^{N+1} (\mathcal{L}_W^i + \mathcal{L}_E^i + \lambda(\mathcal{L}_{W_x}^i + \mathcal{L}_{W_y}^i + \mathcal{L}_c^i)).$$

In some embodiments, merging warped images and/or inpainting candidates according to FIG. 5 and FIG. 6 (e.g., merging in discrete separate steps via distinct modules) need not occur. Rather, some embodiments use a single module such as a single CNN to simultaneously select pixels and combine them together, where the single CNN accepts as input all the warped source images and the single image inpainting (e.g., PROFILL).

Figure 7A:
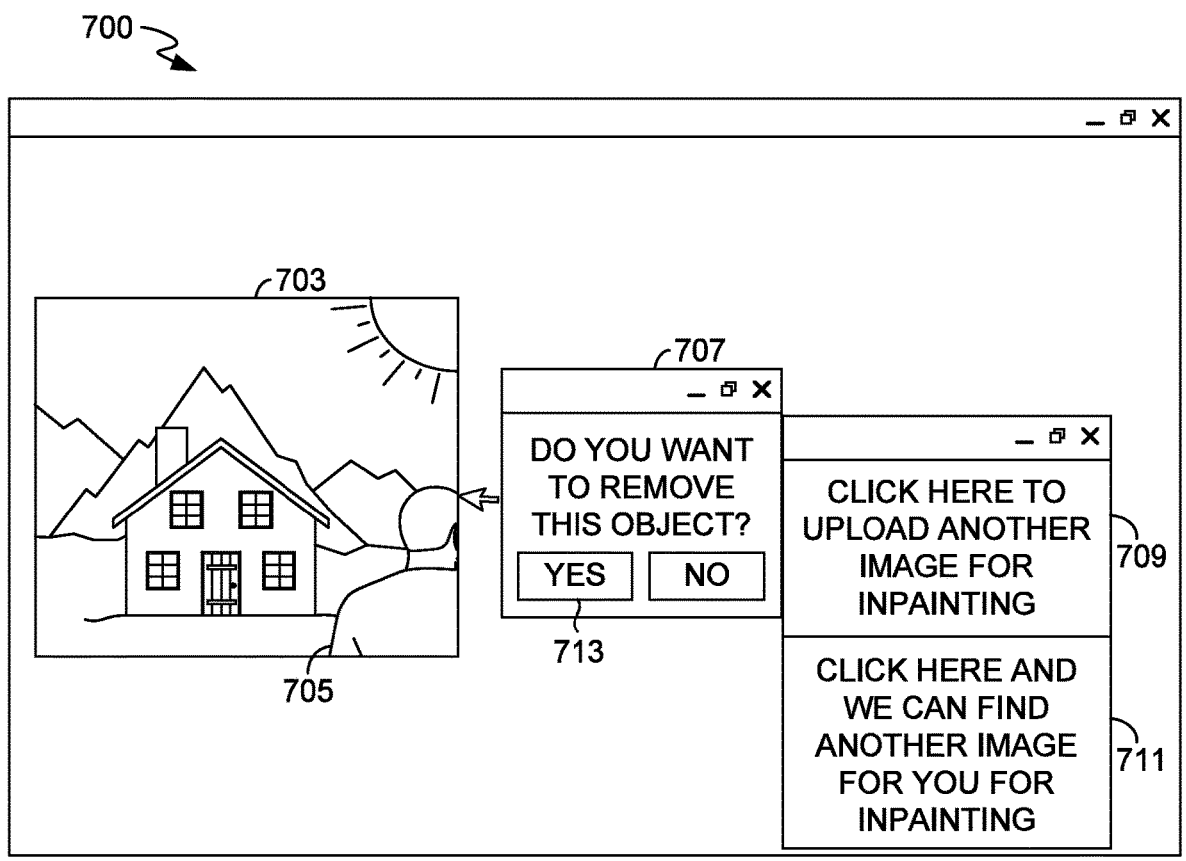
FIG. 7A is an example screenshot of a user interface, according to some embodiments.

FIG. 7A is an example screenshot 700 of a user interface, according to particular embodiments. In some embodiments, the screenshot 700 is rendered by the presentation module 120 and/or the consumer application 190, as described in FIG. 1.

FIG. 7A illustrates a target image 703 that has been uploaded (e.g., to the consumer application 190). Subsequent to the upload, a user may click, select, perform a lasso gesture around, or otherwise make in input action to the set of pixels representing the object 705, which outlines a silhouette of a person covering the rest of the geographical area. In response to receiving such user input, various embodiments prompt, via the dialogue box 707, whether the user would like to remove the object 705 (and fill in or patch the corresponding hole or mask). In response to receiving user input indicating that the user would like to remove the object 705 (i.e., a selection of the "YES" button 713), various embodiments generate another dialog box or prompt to ask the user to either upload one or more other source images (i.e., UI element 709) for inpainting within or under the object 705, or have the associated consumer application or service find an appropriate source image for the inpainting (i.e., UI element 811).

In response to receiving a selection of UI element 709, some embodiments communicate with an operating system component so that the user can browse a local library of images that are related or similar to the target image 703. In response to receiving a selection of the UI element 711, some embodiments automatically perform object detection functionality on the target image 703 and map the corresponding features to features of other images (e.g., as located in the image repository 125 or the web via web scraping). This is done to find similar images so that they can be used as suitable source images that are used for image inpainting, as described herein.

In an illustrative example of object detection functionality, particular embodiments use one or more machine learning models (e.g., a Convolutional Neural Network (CNN)) to generate a bounding box that defines the boundaries and encompasses a computer object representing a feature (e.g., a mountain, set of trees, a building, etc.) of a geographical area. These machine learning models can also generate a classification prediction that the computer object is a particular feature. In computer vision applications, the output of object detection can be encompassed by a bounding box. A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects.

In some embodiments, one or more machine learning models can be used and trained to generate tighter bounding boxes for each object. In this way, bounding boxes can change in shape and confidence levels for classification/prediction can be increased based on increased training sessions. For example, the output of a Convolutional Neural Network (CNN) or any other machine learning model described herein can be one or more bounding boxes over each feature of an image (corresponding to a feature in a real-world geographical area), where each bounding box includes the classification prediction (e.g., this object is a building) and the confidence level (e.g., 90% probability).

Figure 7B:
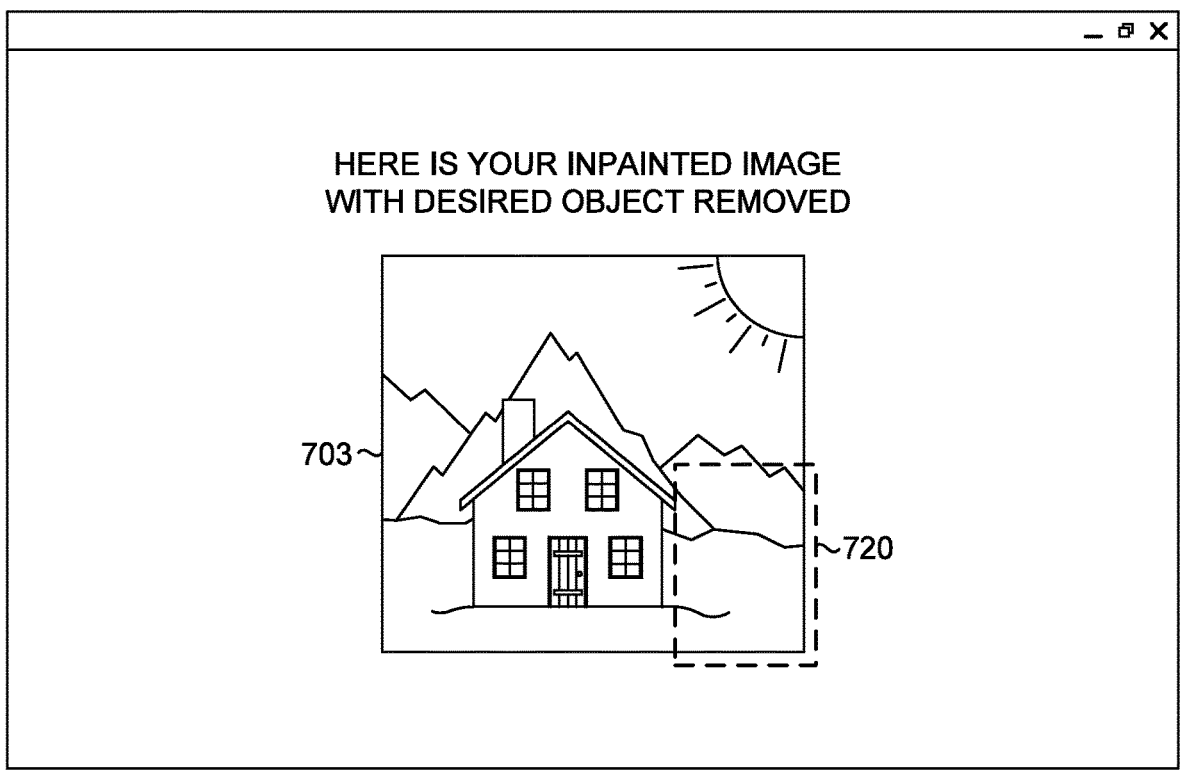
FIG. 7B illustrates an example screenshot of a user interface, according to some embodiments.

FIG. 7B illustrates an example screenshot 700-1 of a user interface, according to some embodiments. In some embodiments, the screenshot 700-1 is rendered at least partially in response to the user making one of the selections of UI element 709 or 711. Accordingly, the same target image 703 is caused to be presented, along with inpainted pixel portion 720, which has replaced the object 705. According to the various embodiments described herein, in response to receiving user selections of 705, 713, 709, and/or 711, functionality described with respect to the system 100 (and/or functionality of FIG. 2, FIG. 3, FIG. 4, FIG. 5, and/or FIG. 6) is performed to produce the target image 703 as illustrated in FIG. 8B. That is, various embodiments generate one or more warped images from one or more source images and merge/select one of the warped images and/or inpainting candidates for image inpainting (e.g., image 215) pixels within the region 720. The pixels within the region 720 may be a combination of merged pixels from the warped images and/or other inpainting techniques (e.g., PROFILL), as described herein.

Exemplary Flow Diagrams

Figure 8:
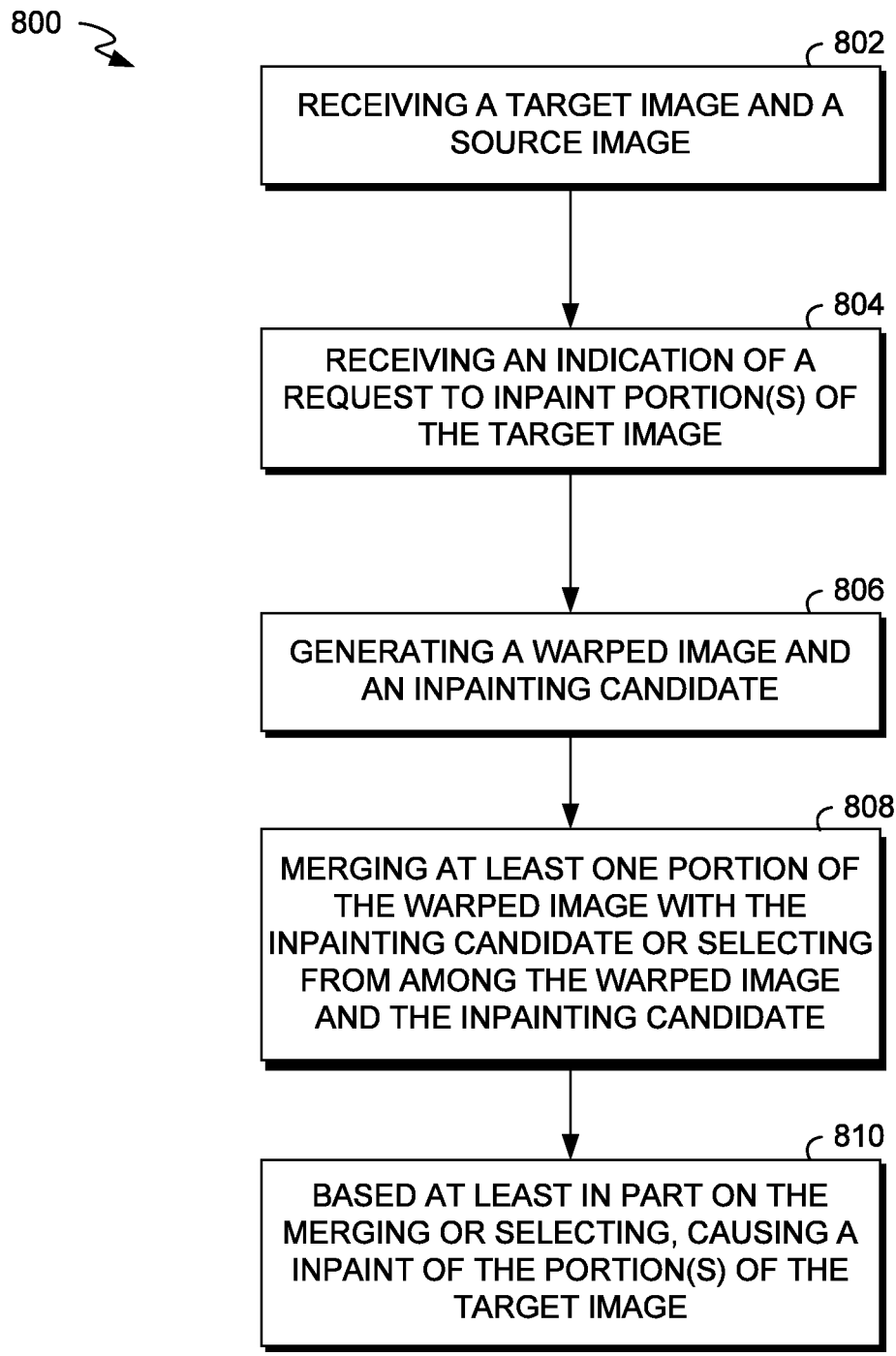
FIG. 8 is a flow diagram of an example process for inpainting one or more portions of a target image, according to some embodiments.

FIG. 8 is a flow diagram of an example process 800 for inpainting one or more portions of a target image, according to some embodiments. In some embodiments, the process 800 represents the functionality as described with respect to the system 100 of FIG. 1. The process 800 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 10). The computer-implemented method, the system (that includes at least one computing device having at least one processor and at least one computer readable storage medium), and/or the computer readable medium as described herein may perform or be caused to perform the process 800 or any other functionality described herein.

Per block 802, a target image and a source image are received. In some embodiments, the target image (e.g., a first image) and the source image (e.g., a second image) are received by a warping registration means (e.g., one or more processors executing a warping registration module 102). In some embodiments the target image and the source image are different images of a same set of physical objects. Such "physical objects" can be background objects (e.g., mountains, trees, grass, buildings, people, etc.) in a geographical area and/or the images can be foreground objects that have little to no background (e.g., a portrait of a person, an animal, a car, etc.). Accordingly, these images can capture one or more of the same real-word physical objects even though one image contains slightly different objects and/or the same objects captured from a different angle, view, or perspective. For example, a target image can be an image can be an image of a geographical area with a train in the background and the source image can be an image of the same geographical area but without the train in the background (e.g., because by the time the source image was captured, the train had passed by the particular geographical image). In another example, the source image could be of the same geographical area with the same train in the background except that is was captured at a drone aerial view, as opposed to a street view that the target image was captured at.

Per block 804, various embodiments receive an indication of a request to inpaint one or more portions of the target image. In some embodiments, the warping registration means performs this step. In various embodiments, an "indication" as described herein refers to any representation of data (e.g., a flag, hash value, token, identifier, etc.) or the data/payload itself. In an illustrative example, a local consumer application may directly receive the request (the "payload"), and then pass such request or "indication" (e.g., a flag) of such request to the warping registration module 102. Examples of block 1004 are described with respect to FIGS. 2 and 7A. For example, with respect to FIG. 7A, a user may select the person object 705 or the button 713. In response to this selection, some embodiments automatically receive the request at block 804 to remove the object 705 and/or inpaint the corresponding mask or set of pixels defined by the object 705.

Per block 806, a first warped image and an inpainting candidate are generated. Examples of block 806 are described with respect to the warped images 209, 211, and 213 of FIG. 2, and FIG. 3 In some embodiments, block 806 is performed by the warping registration module 102. In some embodiments, in response to the receiving of the indication of the request at block 804, some embodiments generate a first warped image by causing a first transformation of the source image. For example, referring back to FIG. 2, the "perspective" warped image 209 is a warped image of the source image 207. In some embodiments, the "inpainting candidate" is a second warped image that is generated by causing a second transformation of the source image. For example, referring back to FIG. 2, the "second transformation" may refer to the "rotation" warped image 211 that is a warped image of the same source image 207. Alternatively, in some embodiments, the inpainting candidate is a set of pixels associated with the target image. For example, the inpainting candidate may be portions of the target image itself (or predicted/learned portions used from the target image) that has been subject to single inpainting methods as described herein. In these examples, the only available input for inpainting is the target image itself. The embodiments use either the image pixels of the target image itself like Photoshop CAF, or learned/memorized features from the large-scale training data like ProFill.

In some embodiments, the warped image and/or the inpainting candidate are parametrically warped images (e.g., affine, rotation, cylindrical, perspective, etc.), as described for example with respect to the warped images 209, 211, and 213.

In some embodiments, the generating of the warped image and the inpainting candidate at block 806 is preceded by (or includes) using a neural network (e.g., a deep learning network) that processes the source image and the target image to align pixels of the source image to corresponding pixels of the target image. In some embodiments, the subsequent warping technique is based on such pixel alignment so that the warping of a source image more closely resembles pixel orientation of objects in the target image. Examples of block 806 are described with respect to FIG. 3. In some embodiments, when feature points are determined between the target image and source image, it is done to determine what warping function to apply to the source image. For example, referring back to FIG. 2, object detection functionality may detect that the object 220 refers to the same object but is at a different angle relative to the object 200-1 as indicated in the source image 207. Accordingly, embodiments can selectively choose to warp the source image 207 to change the angle of the object 200-1 to a similar angle relative to 200, as indicated in the "perspective" warped image 209. In some embodiments, when feature point mapping is determined between the target image and one or more source images, it is done to determine how to align warped and inpainted pixels (e.g., the window 215-1) with a mask or logical hole (e.g., 222) within a target image.

Some embodiments apply, in response to the generating of the warped image (and by one or more processor executing the warping adjustment module 104) at block 806, a location adjustment for a first set of pixels from a first location to a second location within the warped image. Examples of this are described with respect to the warping adjustment module 104 of FIG. 1 and FIG. 4.

Some embodiments additionally generate, at block 806, (by one or more processors executing the warping adjustment module 104) a third warped image (e.g., because the inpainting candidate may be a second warped image) from a third image or a different source image, such that the merging (block 808) is further based on generating the third warped image. For example, referring back to FIG. 2, instead of the cylindrical warping warped image 213 being derived from the source image 207, it can be derived from another source image (not shown in FIG. 2) in order to perform the merging or selecting of the image 215.

In some embodiments, the generating of the warped image and/or the inpainting candidate at block 806 is based on determining one or more homographies between the target and the source image. Examples of this are described with respect to the homography functionality of FIG. 3.

Per block 808, some embodiments merge at least one portion of the warped image with the inpainting candidate. Alternatively, some embodiments select from among one or more portions of the warped image and the inpainting candidate. In some embodiments, block 808 is performed by a fusion means (e.g., a processor executing the fusion module 112). Some embodiments merge at least a first portion of the warped image with at least a portion of the inpainting candidate. Example of this merging is described with respect to the image 215 of FIG. 2, the fusion module 112 of FIG. 1, and FIG. 6. In some embodiments, however, at least one portion of the warped image or at least one portion of the inpainting candidate is selected. This is described with respect to 215 of FIG. 2 and the fusion module 112 of FIG. 1. For example, referring back to FIG. 2, the perspective warped image 209 can be selected (among the other warped images 211, and 213) to use for inpainting at 215 because it more closely resembles the target image 203.

Some embodiments determine (by one or more processors executing a warped image estimation module 106) a pixel color difference between the target image and the source image, wherein the merging (or selecting) at block 808 is further based at least in part on the pixel color difference. Examples of this are described with respect to FIG. 5 and the color change module 108 of FIG. 1.

Some embodiments affirmatively exclude (by one or more processor executing the fusion module) one or more portions of the warped image or inpainting candidate from being selected such that the one or more portions of the warped image or inpainting candidate are not used to cause the inpainting of the one or more portions of the target image. For example, as described with respect to the image 215 of FIG. 2, some embodiments select the image 209 to be input at image 215. In like manner, based on this selection, particular embodiments would likewise exclude the other warped images 211 an 213 from being a part of the inpainting or image 215 (i.e., they are not selected).

Per block 810, based at least in part on the merging or selecting, particular embodiments cause an inpaint of the one or more portions of the target image. In some embodiments, an inpainting means (e.g., one or more processors executing the inpainting module 114) performs block 810. Some embodiments use at least a portion of the warped image (e.g., pixel window 215-1 of FIG. 2) and/or the inpainting candidate to cause an inpaint of the one or more portions of the target image (e.g., target image 203). Examples of block 810 are described with respect to the window of pixels 215-1 of FIG. 2, the inpainting module 114 of FIG. 1, FIG. 7B, and FIG. 6.

In some embodiments, the merging (or selecting) at block 1008 causes a third warped image to be generated (e.g., the image 215 of FIG. 2). Responsively, some embodiments determine that a set of pixels for the source image are missing or outside of a quality threshold and in response to the determination that the set of pixels are missing or outside of the quality threshold, embodiments merge the third warped image with an inpainting technique (e.g., at the portions where pixels are missing or outside of quality threshold) to perform inpainting of the one or more portions of the target image. Examples of this are described with respect to combining warping with PROFILL techniques at FIG. 5 and FIG. 6. A "quality threshold" as described to herein refers to a pixel resolution threshold, pixels per inch threshold (e.g., 300 pixels/inch), RGB threshold, a dot pitch threshold (e.g., 0.297), a compression threshold (e.g., whether or not an image is in its original RAW file format or some compressed format), and/or any other suitable way to detect quality.

Exemplary Operating Environments

Figure 9:
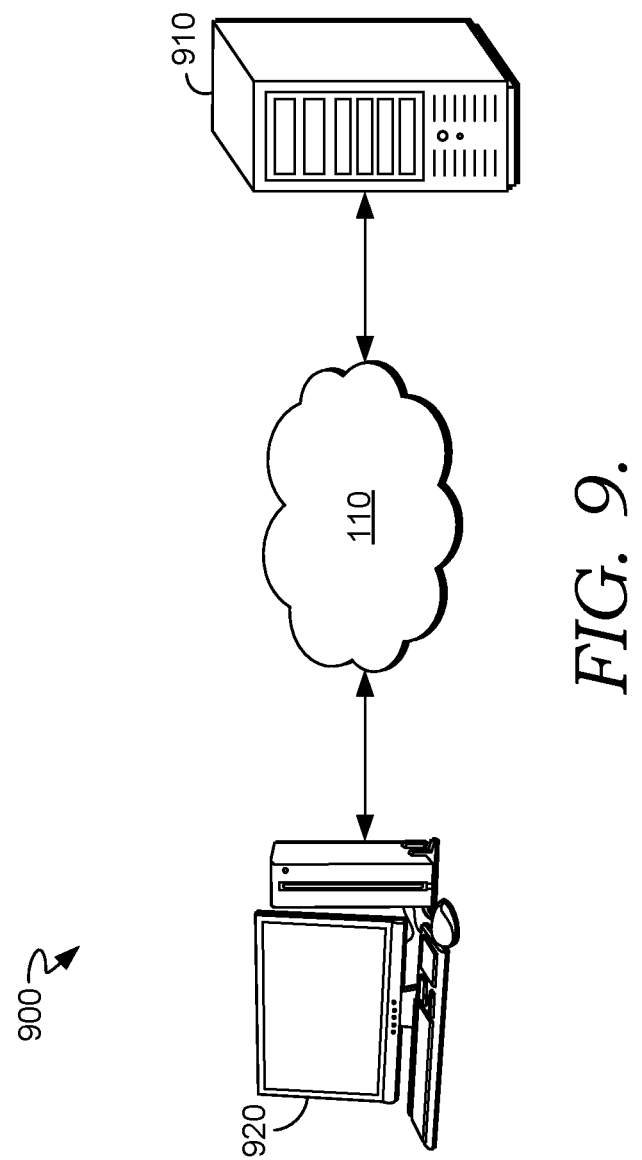
FIG. 9 is an example computer environment in which aspects of the present disclosure are employed, according to some embodiments.

Turning now to FIG. 9, a schematic depiction is provided illustrating an example computing environment 900 for inpainting one or more images of a target image, in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 910 that represent nodes in a cloud computing network. Various functions described herein as being performed by one or more entities may be carried out by hardware, firmware, and/or software. For instance, various functions may be carried out by a processor executing instructions stored in memory.

The environment 900 depicted in FIG. 9 includes a prediction server ("server") 910 that is in communication with a network 110. The environment 900 further includes a client device ("client") 920 that is also in communication with the network 110. Among other things, the client 920 can communicate with the server 910 via the network 110, and generate for communication, to the server 910, a request to inpaint one or more portions of a target image, as described herein. In various embodiments, the client 120 is embodied in a computing device, which may be referred to herein as a client device or user device, such as described with respect to the computing device 1000 of FIG. 10.

In some embodiments, each component in FIG. 1 is included in the server 910 and/or the client device 920. Alternatively, in some embodiments, the components of FIG. 1 are distributed between the server 910 and client device 920.

The server 910 can receive the request communicated from the client 920, and can search for relevant data via any number of data repositories to which the server 910 can access, whether remotely or locally. A data repository can include one or more local computing devices or remote computing devices, each accessible to the server 910 directly or indirectly via network 110. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 1110 is embodied in a computing device, such as described with respect to the computing device 1200 of FIG. 12.

Figure 10:
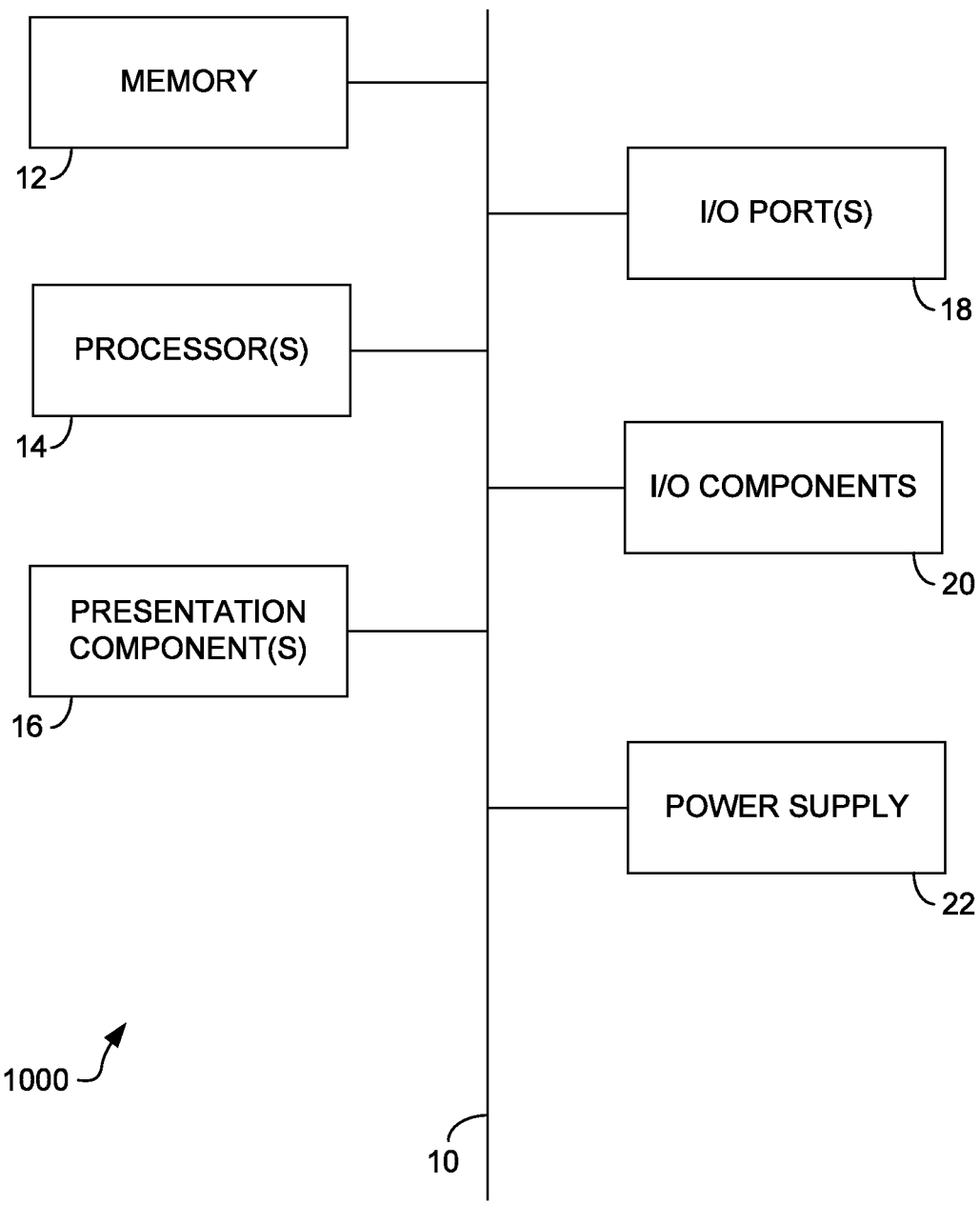
FIG. 10 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Looking now to FIG. 10, computing device 1000 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1000 represents the client device 920 and/or the server 910 of FIG. 9.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 800 of FIG. 8, or any functionality described with respect to FIGS. 1 through 8.

I/O ports 18 allow computing device 1000 to be logically coupled to other devices including U/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer readable medium storing computer-usable instructions that, when used by one or more processors, cause the one or more processors to perform operations comprising:

receiving a target image and a source image;

receiving an indication of a user request to inpaint a portion of the target image by filling in the portion with pixel values that match pixel values of another portion of the target image, the portion including a first set of pixels;

in response to the receiving of the indication of the user request, generating a warped image by causing a first transformation of the source image and generating an inpainting candidate;

producing a merged image by merging at least a first portion of the warped image with at least a second portion of the inpainting candidate, the merged image includes a second set of pixels that match one or more features of the another portion of the target image; and based at least in part on the merging and as part of executing the user request, causing an inpaint of the portion of the target image by replacing the first set of pixels with the second set of pixels such that the target image no longer includes the portion.

2. The non-transitory computer readable medium of claim 1, wherein the generating of the inpainting candidate includes generating a second warped image by causing a second transformation of the source image, and wherein the producing of the merged image includes merging at least the first portion of the warped image with at least a second portion of the second warped image.

3. The non-transitory computer readable medium of claim 2, wherein the generating of the first warped image and the second warped image is based at least in part on determining one or more homographies between the target image and the source image.

4. The non-transitory computer readable medium of claim 1, wherein the inpainting candidate is a set of pixels associated with the target image.

5. The non-transitory computer readable medium of claim 1, wherein the warped image is a parametrically warped image, and wherein the producing of the merged image includes merging differences between the warped image and the inpainting candidate to match at least one of: a color or exposure level of the target image.

6. The non-transitory computer readable medium of claim 1, wherein the generating of the warped image includes using a neural network that processes the source image and the target image to align pixels of the source image to corresponding pixels of the target image.

7. The non-transitory computer readable medium of claim 1, the operations further comprising determining a pixel color difference between the target image and the source image, wherein the merging is further based at least in part on the pixel color difference.

8. The non-transitory computer readable medium of claim 1, the operations further comprising applying, in response to the generating of the warped image, a location adjustment for a first set of pixels from a first location to a second location within the warped image.

9. The non-transitory computer readable medium of claim 1, wherein the target image and the source image are different images of a same set of physical objects.

10. A computer-implemented method comprising:

receiving a target image and a source image;

receiving an indication of a user request to inpaint by patching a hole at the target image with other pixels;

in response to the receiving of the indication of the user request, generating a first warped image by causing a first transformation of the source image and generating an inpainting candidate;

selecting at least one portion of the warped image and the inpainting candidate, the warped image and the inpainting candidate being candidates to patch the hole; and based at least in part on the selecting and as part of executing the user request, cause an inpaint of the hole of the target image.

11. The method of claim 10, wherein the warped image is a parametrically warped image and wherein the hole includes missing pixels or pixels that are outside of a quality threshold.

12. The method of claim 10, wherein the generating of the warped image is preceded by using a learning network to generate feature similarity between the target image and the source image to determine what warping function to apply to the source image.

13. The method of claim 10, further comprising determining a pixel color difference between the target image and the source image, wherein the selecting is further based at least in part on the pixel color difference.

14. The method of claim 10, further comprising applying, in response to the generating of the warped image, a location adjustment for a first set of pixels from a first location to a second location within the warped image.

15. The method of claim 10, wherein the inpainting candidate is a second warped image that is generated by causing a second transformation of the source image or another source image.

16. The method of claim 10, further comprising excluding one or more portions of the warped image from being selected, wherein the one or more portions of the warped image are not used to cause the inpaint of the hole of the target image.

17. The method of claim 10, wherein the generating of the warped image is based on determining one or more homographies between the target image and the source image.

18. The method of claim 10, further comprising:

determining that a set of pixels for the source image are missing or outside of a quality threshold; and in response to the determining that the set of pixels for the source image are missing or outside of the quality threshold, merging the warped image with the inpainting candidate to perform the inpaint of the hole of the target image.

19. A computerized system, the system comprising:

one or more processors; and computer storage memory having computer-executable instructions stored thereon which, when executed by the one or more processors, implement a method comprising:

receiving a target image and a source image, receiving an indication of a user request to inpaint one or more portions of the target image by removing first pixels of the one or more portions and replacing the first pixels with other pixels, and in response to the receiving of the indication of the user request, generating a warped image by causing a first transformation of the source image and generating an inpainting candidate, the warped image and the inpainting candidate being candidates for the replacing of the first pixels with other pixels;

selecting from at least one portion the warped image and the inpainting candidate; and based at least in part on the selecting, cause an inpaint of the one or more portions of the target image.

20. The system of claim 19, the method further comprising merging the at least one portion of the warped image to another portion of a second warped image such that the another portion of the second warped image is also used for the causing of the inpaint of the one or more portions of the target image.

* * * * *

UNITED STATES PATENT AND TRADEMARK OFFICE
CERTIFICATE OF CORRECTION

| | |
|---|---|
| PATENT NO. | : 11,538,140 B2 |
| APPLICATION NO. | : 17/098055 |
| DATED | : December 27, 2022 |
| INVENTOR(S) | : Yuqian Zhou et al. |

It is certified that error appears in the above-identified patent and that said Letters Patent is hereby corrected as shown below:

In the Claims

Column 27, Line 3:
In the line reading "selecting from at least one portion the warped image" should read --selecting from at least one portion of the warped image--.

Signed and Sealed this
Seventh Day of November, 2023

Katherine Kelly Vidal
*Director of the United States Patent and Trademark Office*